United States Patent
Jiang et al.

(10) Patent No.: US 11,218,269 B2
(45) Date of Patent: Jan. 4, 2022

(54) SIGNALING INDICATION METHOD AND DEVICE, COMMUNICATION NODE, AND COMPUTER STORAGE MEDIUM

(71) Applicant: ZTE CORPORATION, Guangdong (CN)

(72) Inventors: Chuangxin Jiang, Guangdong (CN); Zhaohua Lu, Guangdong (CN); Feiming Wang, Guangdong (CN); Yijian Chen, Guangdong (CN); Shujuan Zhang, Guangdong (CN); Meng Mei, Guangdong (CN); Ke Yao, Guangdong (CN); Yuhong Gong, Guangdong (CN); Hao Wu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 123 days.

(21) Appl. No.: 16/497,138

(22) PCT Filed: Mar. 23, 2018

(86) PCT No.: PCT/CN2018/080356
§ 371 (c)(1),
(2) Date: Sep. 24, 2019

(87) PCT Pub. No.: WO2018/171771
PCT Pub. Date: Sep. 27, 2018

(65) Prior Publication Data
US 2020/0106584 A1    Apr. 2, 2020

(30) Foreign Application Priority Data
Mar. 24, 2017 (CN) .......................... 201710184694.2

(51) Int. Cl.
*H04L 5/00* (2006.01)
*H04J 13/16* (2011.01)
(Continued)

(52) U.S. Cl.
CPC ............ *H04L 5/0053* (2013.01); *H04J 13/16* (2013.01); *H04L 1/001* (2013.01); *H04L 1/0004* (2013.01);
(Continued)

(58) Field of Classification Search
CPC ..... H04L 5/00; H04L 1/00; H04L 1/18; H04L 1/001; H04L 1/0004; H04L 1/1893;
(Continued)

(56) References Cited

U.S. PATENT DOCUMENTS

| | | | |
|---|---|---|---|
| 2015/0017747 A1 | 1/2015 | Lam et al. | |
| 2018/0026684 A1* | 1/2018 | Wei | H04L 5/0007 370/329 |
| 2020/0213050 A1* | 7/2020 | Chen | H04L 5/0048 |

FOREIGN PATENT DOCUMENTS

| | | |
|---|---|---|
| CN | 102447524 A | 5/2012 |
| CN | 103685118 A | 3/2014 |

(Continued)

OTHER PUBLICATIONS

WIPO, International Search Report issued for PCT international application No. PCT/CN2018/080356, dated Jun. 1, 2018.
(Continued)

*Primary Examiner* — Kyaw Z Soe
(74) *Attorney, Agent, or Firm* — Li & Cai Intellectual Property (USA) Office

(57) ABSTRACT

An embodiment of the present disclosure is a signaling indication method, comprising: acquiring, by a first communication node, joint indication information, and transmitting the joint indication information from a first communi-
(Continued)

cation node to a second communication node, wherein the joint indication information is used for joint indication. Also disclosed in embodiments of the present disclosure are a signaling indication device and communication node. Also provided in an embodiment of the present disclosure is a computer storage medium.

18 Claims, 13 Drawing Sheets

(51) Int. Cl.
  *H04L 1/00* (2006.01)
  *H04L 1/18* (2006.01)
  *H04W 72/04* (2009.01)
(52) U.S. Cl.
  CPC .......... *H04L 1/1819* (2013.01); *H04L 1/1893* (2013.01); *H04L 5/0051* (2013.01); *H04W 72/044* (2013.01); *H04J 2013/165* (2013.01)
(58) Field of Classification Search
  CPC ... H04L 1/0016; H04L 1/0029; H04L 5/0094; H04L 5/0051; H04L 1/1819; H04L 5/0053; H04J 13/16; H04J 2013/165; H04W 72/04; H04W 72/044
  See application file for complete search history.

(56) References Cited

FOREIGN PATENT DOCUMENTS

| CN | 106160970 A | 11/2016 |
| CN | 106470088 A | 3/2017 |
| WO | 2016127309 A1 | 8/2016 |

OTHER PUBLICATIONS

3GPP TS 36.211 V14.1.0 (Dec. 2016), 3rd Generation Partnership Project; Technical Specification Group Radio Access Network; Evolved Universal Terrestrial Radio Access (E-UTRA); Physical channels and modulation (Release 14).
3GPP TSG-RAN WG1 #88 R1-1703216 Athens, Greece, Feb. 13-17, 2017 Source: Ericsson; Title: On DL DMRS design Agenda Item: 8.1.2.4.2 Document for: Discussion and Decision.
3GPP TSG RAN WG1 Meeting #88 R1-1703883, Athens, Greece, Feb. 13-17, 2017 Agenda Item: 8.1.2.4.2.
China Patent Office, First Office Action dated Nov. 3, 2021 for application No. CN201710184694.2.

* cited by examiner

Pattern 3a Pattern 3b

SIGNALING INDICATION METHOD AND DEVICE, COMMUNICATION NODE, AND COMPUTER STORAGE MEDIUM

CROSS-REFERENCE TO RELATED APPLICATIONS

This application is based on and claims priority to Chinese Patent Application No. 201710184694.2, filed on Mar. 24, 2017, the entire contents of which is hereby incorporated by reference.

FIELD OF THE INVENTION

The present disclosure relates to the field of radio communication, and in particular, to a signaling indication method and device, communication node, and computer storage medium.

BACKGROUND

At present, in the discussion of physical layer technology 3GPP RAN1 of the new generation of radio communication, i.e., new radio (NR), flexibility and high efficiency are the goals pursued by the NR physical layer design. Since different application scenarios may have different requirements for demodulation reference signal (DMRS, demodulation RS), and there are various information related to DMRS ports, such as Modulation and Coding Scheme (MCS), slot structure, phase-tracking reference signal (PTRS, phase noise tracking RS), etc. Therefore, maximum flexibility of the physical layer DMRS becomes a prevailing pursuit. To achieve maximum flexibility, each parameter associated with DMRS ports needs to be configured independently, which results in a large amount of control signaling overhead, thereby reducing the system transmission efficiency.

SUMMARY

The embodiments of the present disclosure are intended to provide a signaling indication method and device, a communication node, and a computer storage medium, according to which the information indication is performed via joint indication information, which at least partially solves the problem of large control signaling overhead and/or low flexibility in the prior art. The technical solutions of embodiments of the present disclosure are realized as follows.

An embodiment of the present disclosure provides a signaling indication method, including: acquiring joint indication information; transmitting the joint indication information to a second communication node; wherein the joint indication information is used for joint indication.

An embodiment of the present disclosure provides a signaling indication method, including: receiving joint indication information transmitted from the first communication node, wherein the joint indication information is used for joint indication.

An embodiment of the present disclosure provides a signaling indication device, comprising: an acquisition unit and a transmission unit, wherein the acquisition unit is configured to acquire joint indication information; and the transmission unit is configured to transmit joint indication information to a second communication node, wherein the joint indication information is used for joint indication.

An embodiment of the present disclosure provides a signaling indication device, including: a reception unit for receiving joint indication information transmitted from the first communication node, wherein the joint indication information is used for joint indication.

An embodiment of the present disclosure provides a first communication node, including: a processor and a transmitter, wherein the processor is configured to acquire joint indication information; and the transmitter is configured to transmit the joint indication information to a second communication node, wherein the joint indication information is used for joint indication.

An embodiment of the present disclosure provides a second communication node, including: a receiver configured to receive joint indication information transmitted from a first communication node, wherein the joint indication information is used for joint indication.

An embodiment of the present disclosure further provides a signaling indication method, including: notifying a total number of resource particle pairs or a number of resource particle groups of the DMRS in a frequency domain transmission period, wherein a resource particle pair refers to a combination of two adjacent resource particles in a frequency domain, and a resource particle group refers to a combination of two resource particle pairs in adjacent time domains.

An embodiment of the present disclosure further provides a computer storage medium for storing a computer executable program; after the execution of the computer executable program, any one of the preceding signaling indication methods can be realized.

An embodiment of the present disclosure provides a signaling indication method and device, communication node, and computer storage medium, a first communication node acquiring joint indication information, and the joint indication information is transmitted from a first communication node to a second communication node, wherein the joint indication information is used for joint indication. The signaling indication method and device, and communication node provided by an embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns provided by the embodiment of the present disclosure solve the problem of power non-equalization.

BRIEF DESCRIPTION OF THE DRAWINGS

FIG. 7 is a schematic diagram of a slot structure of 14 slot symbols according to an embodiment of the present disclosure;

FIG. 8 is another schematic diagram of a slot structure of 14 slot symbols according to an embodiment of the present disclosure;

DETAILED DESCRIPTION OF THE EMBODIMENTS

The present disclosure will be described in detail below with reference to the drawings in conjunction with the embodiments.

First Embodiment

Figure 1:
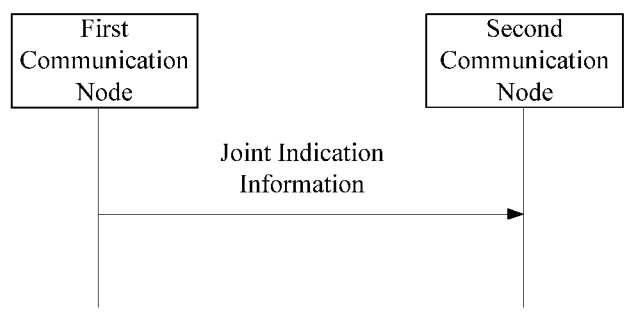
FIG. 1 is a schematic diagram of a signaling indication method according to an embodiment of the present disclosure.

The embodiment of the present disclosure provides a signaling indication method. As shown in FIG. 1, the method includes: acquiring joint indication information, transmitting the joint indication information from a first communication node to a second communication node, the joint indication information including DMRS information, the joint indication information further including at least one of: data modulation scheme, data coding scheme, transmission resource allocation, retransmission redundancy version (RV), PTRS, hybrid automatic repeat request (HARQ) process, time unit structure and data indication information, the joint indication information being used for joint indication.

Acquiring joint indication information described herein refers to a first communication node generating joint indication information or acquiring joint indication information from a higher layer signaling or from other communication nodes.

The time unit shown in the embodiment of the present disclosure may be a slot, a subframe, or a combination of a plurality of slots.

The method may also be understood as the first communication node utilizing joint indication information to notify a second communication node of Demodulation Reference Signal (DMRS) information and at least one of: data modulation scheme, data coding scheme, retransmission RV, phase noise tracking RS (PTRS), Hybrid Automatic Repeat Request (HARQ) process, time unit structure, transmission resource allocation and data indication information.

Herein, the data indication information includes: indication information to retransmit data or new data indication information.

The DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

In the embodiment of the present disclosure, the first communication node may be a base station, and the second communication node may be a terminal, i.e., joint indication information is transmitted from the base station to the terminal.

In the embodiment of the present disclosure, the higher layer signaling may be RRC signaling and MAC signaling, or may be a set of RRC signaling and MAC signaling. In the present embodiment, the higher layer signaling may be a MAC layer or an RRC layer above the physical layer. The higher layer signaling may be a signaling other than a physical layer signaling.

Similar to DMRS information and joint information indication of data coding and modulation scheme, the base station may indicate, via indication bits of the joint indication information, more than one of DMRS information, indication information to retransmit data (or new data indication information), retransmission RV, HARQ process, PTRS, transmission resource allocation, and the like.

Herein, the transmission resource allocation refers to a size of the physical resource allocated by the base station to a user terminal and a frequency domain position, i.e., on which PRB or RBG.

Data retransmission indication refers to whether TB or CBG (code block group) transmitted last time needs to be retransmitted or not; new data indication refers to whether TB or CBG transmitted this time is new data or retransmission of last time.

HARQ process information includes HARQ process sequence number or number of processes.

Similar to Long Term Evolution (LTE), prior to channel coding, it is possible that one TB block of NR is divided into a plurality of CBGs, each CBG may be separately coded. If N CBGs corresponds to one TB, N1 CBGs are correctly transmitted and N2 CBGs are incorrectly transmitted, the user may need N bits to feed back which are correctly transmitted and which are incorrectly transmitted, such that the base station only needs to retransmit the CBGs that have been incorrectly transmitted last time in the TB during retransmission, without the need to retransmit the whole TB. Compared with LTE that retransmits the whole TB, such NR method increases the transmission efficiency. Assuming that the maximum number of CBGs included in one TB configured by a higher layer signaling is N, the user terminal may need N bits to feed back ACK/NACK of each CBG. At the same time, for each TB, the base station may need N bits to indicate to the user terminal which CBG is retransmitted and which is new data. If the base station configures one TB for the user terminal, only N bits are actually needed to notify the data retransmission indication or data indication information of the CBG. If the base station configures 2 TBs for the user terminal, only 2N bits are actually needed to notify the data retransmission indication or data indication information of the GBG. If the base station separately configures the retransmission of GBG (or new GBG indication information) and the number of data TB blocks, the base station always needs to reserve 2N bits in the physical layer dynamic DCI even though only one TB block is actually transmitted. Therefore, notification of TB information and CBG new data indication are jointed to save overhead. In the system, the number of TBs is implicitly notified by the number of data layers. In NR, one TB block may be mapped to a maximum of 4 data layers, corresponding to 4 DMRS ports. If exceeding 4 data layers, 2 TBs need to be transmitted. Therefore, joint notification of DMRS information (or layer information) and CBG retransmission (or new data indication) can save signaling overhead.

As shown in Table 1, one codeword (CW, i.e. TB) only needs N bits, assuming N=4, that is, one TB includes at most 4 CBGs, the 4-bit CBG new data indication can indicate whether the corresponding CBG is new data or retransmitted CBG. For example, 0001 indicates that the last CBG is new data while the former 3 CBGs are retransmitted data. Retransmission RV is directed to each retransmitted data, and indicates the redundancy version used in retransmission. Assuming that there are two versions for each retransmitted data, that is, one bit is required for indication, then for 4 CBGs, a maximum of 4-bit RV is required for indication. For two TBs, which correspond to 8 CBGs, an 8-bit RV is required. In Table 1, C bits are used to transmit the RV of multiple CBGs in one TB.

The first communication node notifies the second communication node of the DMRS information and/or MCS information and/or CBG new data indication and/or retransmission RV by using joint indication information. In Table 1, each indication bit index actually represents a plurality of states, thus more indication bit indexes are actually needed to represent different DMRS information, MCS information, CBG new data indication information, etc. For example, indication bit index 0 in Table 1 actually requires multiple states, such as M=5, N=4, C=4, then 32×16×16 indexes are required to represent the indication bit index 0 in Table 1.

TABLE 1

Joint Notification of DMRS Information and/or MCS Information and/or CBG New Data Indication and/or Retransmission RV

| Indication Bit | Layers, DMRS port/pattern/ scrambling | Modulation and Coding Scheme (MCS) | CBG New Data Indication | Retransmission RV |
|---|---|---|---|---|
| 0 | 1 layers, port 1, pattern A1, $n_{SCID} = 0$ | 1CW, $MCS_0$ (M bits) | N bits | C bits |
| 1 | 1 layers, port 1, pattern A1, $n_{SCID} = 1$ | 1CW, $MCS_0$ (M bits) | Nbits | C bits |

TABLE 1-continued

Joint Notification of DMRS Information and/or MCS Information and/or CBG New Data Indication and/or Retransmission RV

| Indication Bit | Layers, DMRS port/pattern/ scrambling | Modulation and Coding Scheme (MCS) | CBG New Data Indication | Retransmission RV |
|---|---|---|---|---|
| 2 | 1 layers, port 2, pattern A1, $n_{SCID} = 0$ | 1CW, $MCS_0$ (M bits) | N bits | C bits |
| 3 | 1 layers, port 2, pattern A1, $n_{SCID} = 1$ | 1CW, $MCS_0$ (M bits) | Nbits | C bits |
| . | 1 layers, port $x_1$, pattern X1, $n_{SCID} = 0$ | 1CW, $MCS_0$ (M bits) | bits | C bits |
| . | 1 layers, port $x_1$, pattern X1, $n_{SCID} = 1$ | 1CW, $MCS_0$ (M bits) | N bits | C bits |
| | 2 layers, port 1, 2, pattern A2, $n_{SCID} = 0$ | 1CW, $MCS_0$ (M bits) | N bits | C bits |
| | 2 layers, port 1, 2, pattern A2, $n_{SCID} = 1$ | 1CW, $MCS_0$ (M bits) | N bits | C bits |
| . . . | | | | |
| | 2 layers, port $x_1$, $x_1 + 1$ pattern X2, $n_{SCID} = 0$ | 1CW, $MCS_0$ (M bits) | N bits | C bits |
| | 2 layers, port $x_1$, $x_1 + 1$ pattern X2, $n_{SCID} = 1$ | 1CW, $MCS_0$ (M bits) | N bits | C bits |
| | 3 layers, port 1, 2, 3 pattern A3, $n_{SCID} = 0$ | 1CW, $MCS_0$ (M bits) | N bits | C bits |
| . . . | | | | |
| | 4 layers, port $x_1$, $x_1 + 1$, $x_1 + 2$, $x_1 + 3$ pattern X3, $n_{SCID} = 0$ | 1CW, $MCS_0$ (M bits) | N bits | C bits |
| | 5 layers, port 1-5, pattern A5, $n_{SCID} = 0$, wherein $MCS_0$ and $MCS_1$ correspond to 3 layers and 2 layers, respectively | 2CW, $MCS_0$ (M bits) $MCS_1$ (M bits) | N bits | 2 C bits |
| . . . | | | | |
| | 5 layers, port 1-5, pattern X5, $n_{SCID} = 0$ | 2CW, $MCS_0$ (M bits) $MCS_1$ (M bits) | Nbits | 2 C bits |
| | 6 layers, port 1-5, pattern A6, $n_{SCID} = 0$, wherein $MCS_0$ and $MCS_1$ respectively correspond to 3 layers | 2CW, $MCS_0$ (M bits) $MCS_1$ (M bits) | N bits | 2 C bits |
| . . . | | | | |
| | 8 layers, port 1-8, pattern X8, 2CW, $n_{SCID} = 0$, wherein $MCS_0$ and $MCS_1$ respectively correspond to 4 layers | 2CW, $MCS_0$ (M bits) $MCS_1$ (M bits) | N bits | 2 C bits |

The signaling indication method according to the embodiment of the present disclosure may use the correlation among various parameter information in NR to indicate information through joint signaling, i.e., joint indication information, to thereby effectively and jointly notify parameter information such as DMRS, data modulation and coding scheme, and PTRS, which saves control signaling overhead and increases flexibility.

Second Embodiment

The embodiment of the present disclosure provides a signaling indication method that may include: transmitting joint indication information from a first communication node to a second communication node, the joint indication information including: PTRS configuration information and DMRS information, i.e., the DMRS information and the PTRS configuration information are jointly indicated, wherein the DMRS information refers to a multiplexing scheme of a plurality of ports on a plurality of time domain symbols, the multiplexing scheme including: Time Division Multiplexing (TDM) and Code Division Multiplexing (CDM). For example, the DMRS information is used to indicate whether the plurality of DMRS ports employ CDM on a plurality of time domain symbols. Optionally, the DMRS is transmitted using CDM, which does not coexist with PTRS transmission. It is possible to simultaneously indicate transmission of DMRS using CDM and non-transmission of PTRS through joint indication, or, transmission of DMRS using non-CDM and transmission of PTRS.

Herein, the PTRS configuration information includes: information indicating presence of higher layer configured PTRS, i.e., information on existence of higher layer-configured PTRS, information on non-existence of higher layer-configured PTRS; or the PTRS configuration information includes: information indicating presence of higher layer configured PTRS, an indication value of a digital modulation and coding scheme, and a threshold value of the data modulation and coding scheme. The indication value of the digital modulation and coding scheme is used for dynamically indicating the digital modulation and coding scheme, and the digital modulation and coding scheme here may correspond to the modulation and coding scheme described above.

Optionally, the base station uses joint indication information to indicate whether the PTRS exists and the multiplexing scheme of the plurality of DMRS ports on the time domain symbols.

Wherein, the multiplexing scheme of the plurality of DMRS ports in the time domain is divided into CDM and non-CDM such as TDM.

Significantly, joint indication information is transmitted from a first communication node to a second communication node, the joint indication information including: DMRS configuration information and PTRS information, i.e., the DMRS information and the PTRS configuration information are jointly indicated, wherein the DMRS information refers to a multiplexing scheme of a plurality of ports on a plurality of time domain symbols, the multiplexing scheme including: TDM and CDM. It can also be applied to joint indication of configuration information of other reference signals and the PTRS information. For example, joint indication information is transmitted from a first communication node to a second communication node, the joint indication information including: PTRS configuration information and channel state information reference signal (CSI-RS) information, i.e., the CSI-RS information and the PTRS configuration information are jointly indicated, wherein the CSI-RS information refers to a multiplexing scheme of multiple ports on multiple time domain symbols, for example, the multiplexing scheme includes TDM and CDM.

In the embodiment of the present disclosure, the first communication node may be a base station, and the second communication node may be a terminal, i.e., the joint indication information is transmitted from the base station to the terminal.

In the embodiment of the present disclosure, the higher layer signaling may be RRC signaling and MAC signaling, or may be a set of RRC signaling and MAC signaling.

As an exemplary example, the PTRS configuration information includes a higher layer signaling, the base station uses a higher layer Radio Resource Control (PRC) signaling to semi-statically indicate a user terminal whether PTRS can exist. If semi-statically-configured PTRS exists, it is proved that the frequency band for data transmission is relatively high, thus phase noise probably exists. At this time, the phase noise may cause phase change of Orthogonal Frequency Division Multiplexing (OFDM) symbols in different time domains. That is to say, if the phase noise is severe, channel difference between adjacent OFDM symbols is relatively large. Optionally, the best case for a plurality of DMRS ports to be code division multiplexed on multiple time domain symbols is that the channels on the multiple time domain symbols are same or proximate, otherwise the CDM effect would be inferior, thereby resulting in performance decline of channel estimation. In summary, the existence of phase noise would influence properties of the plurality of DMRS ports in performing CDM in the time domain. Regarding whether phase noise can exist, it may be determined according to Radio Resource Control (RRC) signaling. Therefore, the base station uses the same signaling to indicate not only whether PTRS can exist but also whether the plurality of DMRS ports are performed with CDM on the time domain symbols. If CDM is unusable, it is preferable that the multiple ports are not performed with CDM in the time domain but performed with, for example, TDM.

The joint indication information is only suitable for a case where the DMRS has a plurality of time domain symbols, in particular to a case where the DMRS has at least two rows of adjacent DMRS OFDM symbols.

Figure 2:
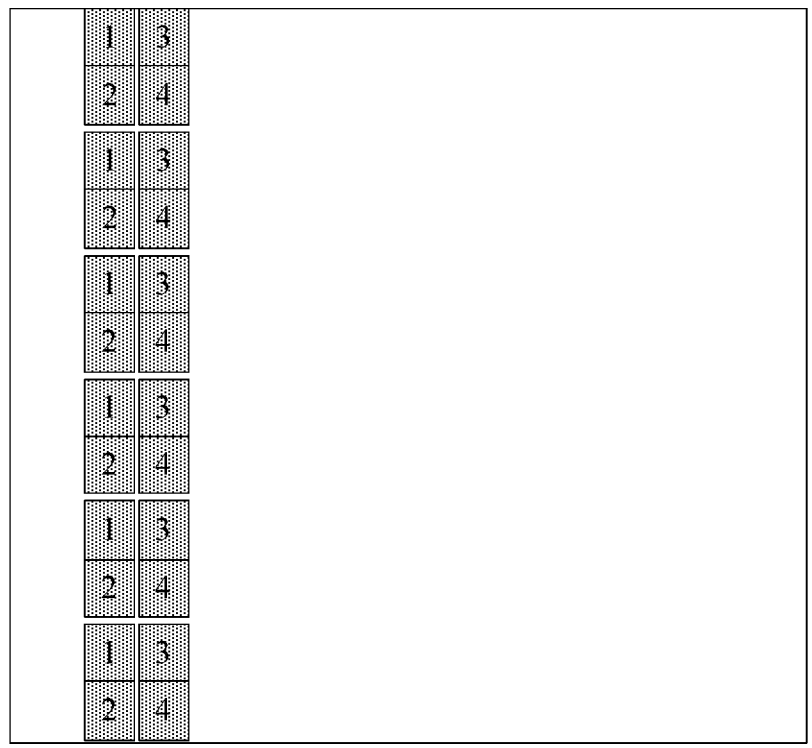
FIG. 2 is a schematic diagram of a DMRS pattern of two symbols according to an embodiment of the present disclosure.

As shown in FIG. 2, when performing CDM, DMRS ports p #1 and p #3 are code division multiplexed on two adjacent OFDM symbols, and ports p #1 and p #3 occupy the same Resource Elements (REs), such as two adjacent REs in the time domain, the orthogonal mask OCC code used by p #1 is [1 1], and the OCC code used by p #3 is [1 −1]. For one DMRS port of one user terminal, if the channels on two adjacent OFDM symbols are the same or proximate, the CDM can bring forth code division gain, thereby increasing the accuracy of channel estimation to improve transmission efficiency. However, in a high frequency band, the phase noise often causes phase deviation of the channels among different OFDM symbols, so that the channel estimation accuracy of the CDM method is reduced, thus TDM is a good choice at this time.

As shown in FIG. 2, when performing TDM, ports p #1 and p #3 are time division multiplexed on two adjacent OFDM symbols, and p #1 and p #3 occupy different REs. In FIG. 2, port p #1 is mapped on the first OFDM symbol where the DMRS is located, and p #3 is mapped on the second OFDM symbol. In FIG. 2, ports p #2, p #4 are similar to p #1, p #3. Therefore, whether different ports are CDM or TDM on different OFDM symbols can be determined according to whether there is phase noise, TDM is performed in existence of phase noise, and CDM is performed in non-existence of phase noise. Whether phase noise exists can be determined according to whether PTRS can exist. In this way, the base station can use joint information to indicate not only whether the PTRS can exist, but also whether different ports are CDM or TDM on different OFDM symbols, which can be determined according to whether there is phase noise.

As an exemplary example, the base station indicates with 1 bit RRC signaling, 0 indicates that PTRS cannot exist and different DMRS ports are performed with CDM on different time domain symbols, and 1 indicates that PTRS can exist and different DMRS ports are performed with TDM on different time domain symbols. In other words, the higher layer signaling that the base station notifies whether PTRS exists and the signaling that the base station notifies whether the plurality of DMRS ports are performed with CDM or TDM are the same signaling.

It should be noted that whether RRC signaling-configured PTRS exists does not necessarily mean that a PTRS of a user terminal must exist. If RRC-configured PTRS can exist, the UE may determine whether the PTRS is actually transmitted according to the dynamically-configured MCS. For example, if the MCS is greater than a threshold, the PTRS is transmitted, otherwise it is not transmitted. This threshold is also configured by the RRC signaling. If the RRC-configured PTRS cannot exist, then the PTRS will not be transmitted no matter how many MCS are in existence. Therefore, whether the plurality of DMRS ports are performed with CDM or TDM may also be determined according to the RRC signaling configuring the PTRS, MCS and threshold. For example, if RRC configures PTRS and the MCS is greater than the threshold, the plurality of DMRS ports are performed with TDM, otherwise they are performed with CDM. In other words, the base station indicates the multiplexing scheme of the plurality of DMRS ports, the PTRS-related RRC signaling, the MCS indication, and the threshold through joint information.

In addition, the DMRS pattern involved in the embodiment of the present disclosure does not discuss the mapping manner of the DMRS ports in the frequency domain. As shown in FIG. 2, p #1 and p #2 may be performed with frequency division multiplexing (FDM) on two REs in adjacent frequency domains, and in this case, p #1 and p #2 occupy different REs in the frequency domain, which may also be performed with CDM.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Third Embodiment

The embodiment of the present disclosure provides a signaling indication method that may include: transmitting joint indication information from a first communication node to a second communication node, the joint indication information including: first information and DMRS information, the first information including: data modulation scheme configuration information, data coding scheme configuration information or data modulation and coding scheme configuration information, i.e., the DMRS information is jointly indicated with the data modulation scheme configuration information, the data coding scheme configuration information or the data modulation and coding scheme configuration information, wherein the DMRS information includes at least one of: a number of DMRS time domains symbols and information on whether the DMRS and data are simultaneously transmitted.

Wherein, the data modulation scheme configuration information includes at least one of: a dynamic data modulation scheme and a higher layer signaling-configured data modulation scheme threshold;

the data modulation scheme configuration information includes at least one of: a dynamic data coding scheme and a higher layer signaling-configured data coding scheme threshold; and the data modulation and coding scheme configuration information includes at least one of: a dynamic data modulation and coding scheme and a higher layer signaling-configured data modulation and coding scheme threshold.

In the embodiment of the present disclosure, the first communication node may be a base station, and the second communication node may be a terminal, i.e., joint indication information is transmitted from the base station to the terminal.

In the embodiment of the present disclosure, the higher layer signaling may be RRC signaling and MAC signaling, or may be a set of RRC signaling and MAC signaling.

Optionally, under the condition that the Signal to Interference Plus Noise Ratio (SINR) is relatively low, the base station preferably configures a higher DMRS density to the user terminal to improve channel estimation accuracy, while under the condition that the SINR is relatively high, the base station may lower the DMRS density to save DMRS resources for data transmission. The level of SINR can be known from the dynamically-notified MCS. If the MCS is greater than a threshold, it is considered that SINR is relatively high, thus a lower DMRS density is configured, and if the MCS is less than a threshold, it is considered that SINR is relatively low, thus a higher DMRS density is configured for the user terminal. The base station may notify the user terminal of the MCS threshold using higher layer signaling.

Figure 3:
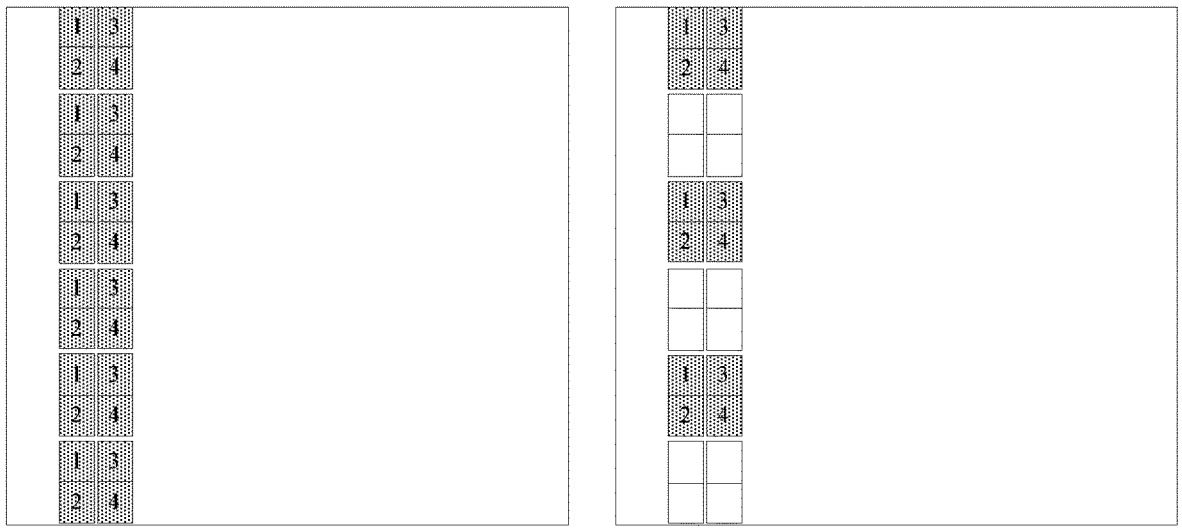
FIG. 3 is a schematic diagram illustrating whether DMRS and data are frequency division multiplexed according to an embodiment of the present disclosure.

As shown in FIG. 3, if the MCS value obtained by the user terminal from the dynamic DCI information is greater than the threshold configured by the higher layer signaling, the DMRS pattern can be considered as shown in the right figure of FIG. 3, and the blank REs are used to transmit data, namely DMRS and data FDM. If the MCS value obtained by the user terminal from the dynamic DCI information is less than the threshold configured by the higher layer signaling, the DMRS pattern can be considered as shown in the left figure where the DMRS density is high and is not frequency division multiplexed with data. This method is especially suitable for the case where the number of DMRS ports is large, for example, the number of DMRS ports is greater than or equal to 4, as shown in FIG. 3.

Figure 4:
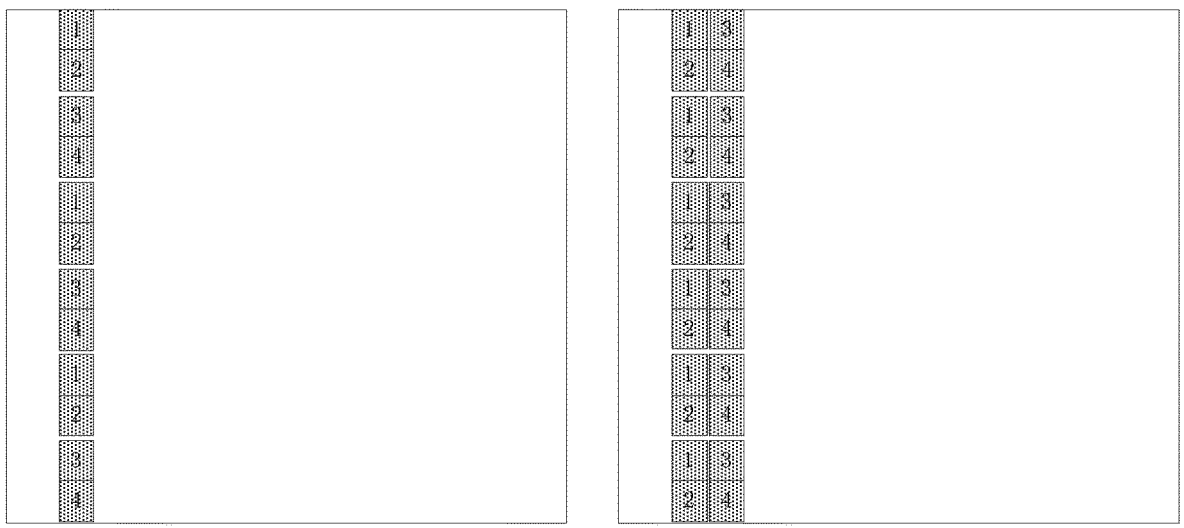
FIG. 4 is a schematic diagram of DMRS occupying one or two rows of time domain symbols according to an embodiment of the present disclosure.

Similarly, if the MCS is relatively low, the DMRS needs to occupy two symbols for better channel estimation, and when the MCS is relatively high, only one time domain symbol is needed to transmit the DMRS, and the remaining resources can be used to transmit data. As shown in FIG. 4, the base station may use a dynamic signaling of MCS and a higher layer-configured threshold to implicitly notify that the DMRS occupies one OFDM symbol or two OFDM symbols.

In summary, the base station notifies the user terminal of dynamic MCS information and a higher layer-configured threshold, and also of a number of DMRS time domain symbols or whether DMRS is frequency division multiplexed with data.

Figure 5:
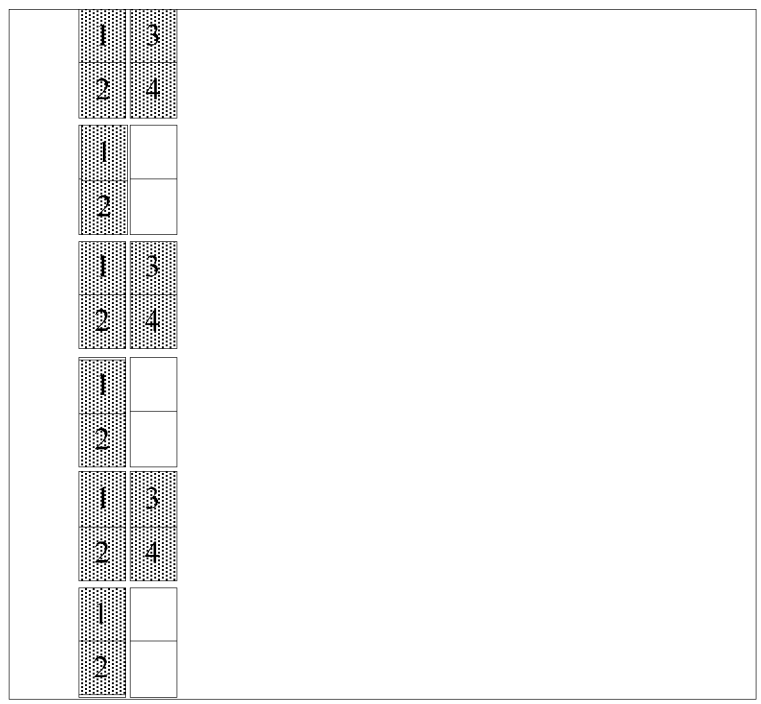
FIG. 5 is a schematic diagram of different DMRS ports corresponding to different DMRS patterns according to an embodiment of the present disclosure.

Since different transmission layers (corresponding to one DMRS port) or different codewords (similar to LTE TB) may correspond to different MCSs, if different DMRS ports correspond to different MCS values, the DMRS patterns corresponding to different DMRS ports may be different. For example, if the MCS value corresponding to ports 1, 2 is lower than the higher layer-configured MCS threshold, ports 1, 2 require higher density, that is, they are not multiplexed with data or two time domain symbols are required to transmit the DMRS, while the MCS value corresponding to ports 3, 4 is higher than the higher layer-configured threshold, ports 3, 4 require lower density, that is, they can be frequency division multiplexed with data or only one time domain symbol is required to transmit the DMRS. In other words, different modulation schemes and/or coding schemes correspond to densities of different DMRS ports, that is, different data modulation schemes correspond to densities of different DMRS ports; different data coding schemes correspond to densities of different DMRS ports; different data modulation and coding schemes correspond to densities of different DMRS ports, as shown in FIG. 5.

It should be noted that the threshold of the MCS in the embodiment of the present disclosure may be a higher layer-configured value or a predefined value, which requires no signaling notification. In addition, the dynamic MCS and the MCS threshold can notify the modulation and coding scheme jointly like LTE, and also notify the modulation scheme and the coding scheme separately. In this case, the MCS threshold may be set only for the modulation scheme, for example, as 16 QAM (Quadrature Amplitude Modulation), regardless of the coding efficiency. Of course, the MCS threshold may also be set only for code rate regardless of the modulation scheme.

Since the number of symbols occupied by the DMRS and whether it is frequency division multiplexed with data have relations with the DMR pattern, that is to say the joint indication information includes first information and a DMRS pattern, the first information including at least one of: data modulation scheme configuration information, data coding scheme configuration information and data modulation and coding scheme configuration information. Herein, the data modulation scheme configuration information includes at least one of: a dynamic data modulation scheme and a data modulation scheme threshold; the data coding scheme configuration information includes at least one of: a dynamic data coding scheme and a data coding scheme threshold; the data modulation and coding scheme configuration information includes at least one of: a dynamic data modulation and coding scheme and a data modulation and coding scheme threshold.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Fourth Embodiment

Figure 6:
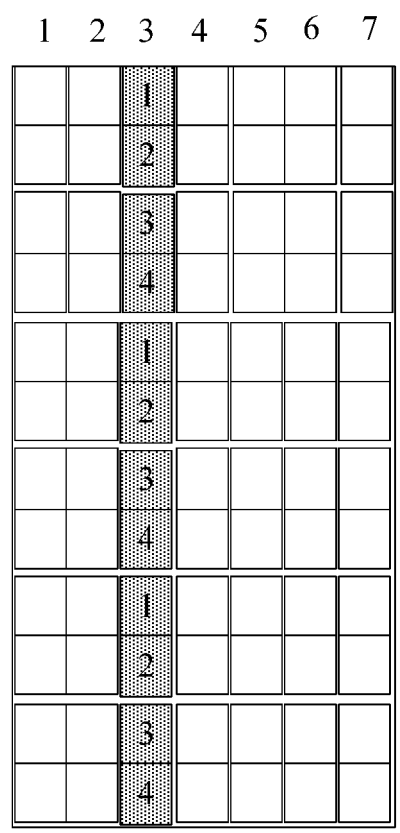
FIG. 6 is a schematic diagram of a slot structure of Front loaded DMRS in 7-symbol according to an embodiment of the present disclosure.

The embodiment of the present disclosure provides a signaling indication method that may include: transmitting joint indication information from a first communication node to a second communication node, when the joint indication information includes a time unit structure and a DMRS pattern, i.e., when the DMRS pattern and the time unit structure are jointly indicated, the DMRS pattern includes at least one of: a number of DMRS time domain symbols and a maximum number of orthogonal DMRS ports that the DMRS pattern supports; or the DMRS pattern includes a spacing position of time domains of the first subset and second subset of the DMRS. The time unit structure refers to a total number of symbols included in the time unit, a total number of symbols included, a number of guard period symbols, and a number of uplink symbols included. Different time units may include different numbers of these symbols. Optionally, one time unit refers to one slot, or a set of a plurality of slots. For example, some time units include 7 time domain symbols while some time units include 14 time domain symbols, this indicates that the two time units have different structures. For example, even if the two time units both include 7 time domain symbols, but the first time unit includes one uplink time domain symbol and one guard period symbol, and the remaining five time domain symbols are used for downlink (DL) transmission. Whereas the 7 time domain symbols included in the second time unit are all used for downlink transmission, as shown in FIG. 6, that is, the first time unit is different from the second time unit.

The time unit structure described in the present disclosure may generally refer to a slot structure. Different slot structures may include different numbers of total time domain symbols, or different numbers of uplink time domain symbols.

In the embodiment of the present disclosure, the first communication node may be a base station, and the second communication node may be a terminal, i.e., joint indication information is transmitted from the base station to the terminal.

In the embodiment of the present disclosure, the higher layer signaling may be RRC signaling and MAC signaling, or may be a set of RRC signaling and MAC signaling.

Figures 7, 8:
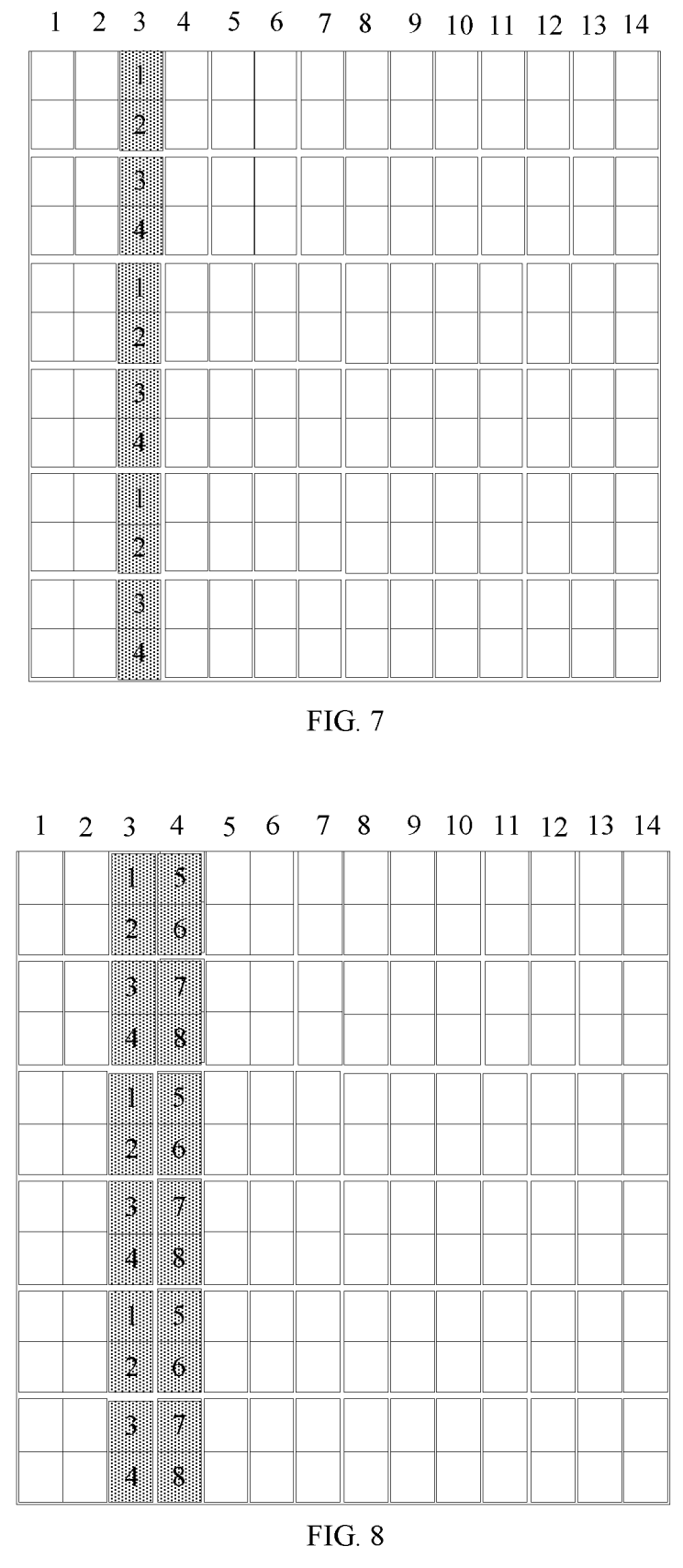

The NR may support two or more slot structures such as the two slot structures as shown in FIG. 6, the first being a slot structure including 7 time domain symbols, and as shown in FIG. 7 and FIG. 8, the second being a slot structure including 14 time domain symbols. At the same time, the NR needs to support a self-contained slot structure, that is, in the same slot, the base station schedules downlink data transmission in the slot through dynamic control signaling (such as PDCCH), and the user terminal detects the PDSCH in the same slot and reports whether the reception is correct or not, that is, scheduling, data transmission and ACK/NACK feedback are completed in the same slot. This exhibits a high requirement for the demodulation speed of the user terminal. At this point, the DMRS needs to be placed in the front part of the PDSCH area in the slot. Such DMRS placed in the front can be called front loaded DMRS. For such self-contained slot structure, generally the last one or two time domain symbols are used to transmit ACK/NACK, and a guard period of at least one symbol is required between the downlink data and the ACK/NACK.

A slot structure with 7 symbols is shown in FIG. 6, assuming that symbol #7 is used for the user terminal to feed back ACK/NACK, symbol #6 is used for guard period, that is, does not transmit any data but for uplink and downlink switch. The symbols #1, #2 are used by the base station to transmit the PDCCH, and only the symbols 3, 4, and 5 can be used to transmit data and DMRS. If the DMRS occupies two time domain symbols, then there are very few resources available for the data. Therefore, when the time slot is 7 symbols, it is necessary to limit the front loaded DMRS to one symbol. At this time, the base station can implicitly notify the number of the DMRS symbols using the signaling that notifies the slot structure. That is to say, the base station can use joint information to indicate the slot structure and the number of DMRS symbols. This indication is especially suitable for a case where the DMRS is front loaded. If the front loaded DMRS is not needed, or there is no need to transmit the ACK/NACK and the PDSCH in the same subframe, the joint indication information may not be referred to.

For example, since whether the DMRS time domain symbol is limited to only one depends on the number of time domain symbols available for downlink data transmission (including downlink DMRS) included in the time unit, it can also be said that the base station can use joint information to indicate the time unit structure and the number of DMRS symbols, wherein the time unit structure refers to the number of time domain symbols for downlink data transmission (including the downlink DMRS) included therein. If the number of time domain symbols for downlink data transmission is less than a threshold, then the time unit supports only one symbol for DMRS transmission, otherwise it can support two time domain symbols for DMRS transmission. For example, as shown in FIG. 6, if the last two time domain symbols are used for guard period and uplink data transmission, then there would be only three time domain symbols for downlink data transmission (assuming that two symbols are used for PDCCH transmission), it is considered that for the front loaded DMRS pattern, maximum of one time domain symbol is supported for DMRS transmission, that is, two consecutive time domain symbols are not supported for DMRS transmission. At this time, it can be considered that the threshold is 4; and if the last two time domain symbols in FIG. 6 are also used for downlink data transmission, that is, there is no guard period or uplink transmission symbol in this slot, then it can be considered that two consecutive time domain symbols are supported for DMRS transmission.

As shown in FIG. 7 and FIG. 8, if the slot structure has 14 symbols, the number of front loaded DMRS symbols may be 1 or 2. Therefore, the base station can use the slot structure information to indicate whether the number of DMRS symbols used for fast demodulation is 1 or 2. For example, the base station indicates the user terminal of the slot structure using 1-bit DCI information, wherein 0 represents 7 symbols and 1 represents 14 symbols. If the DMRS is front loaded DMRS, it means that fast demodulation and feedback are required, then the DMRS occupies only one time domain symbol, and 1 also indicates that the DMRS may occupy one or two time domain symbols.

Since the maximum number of DMRS ports that can be supported by one DMRS time domain symbol is smaller than the maximum number of DMRS ports that are supported by two DMRS time domain symbols, it can also be said that the base station indicates the maximum number of DMRS ports supported by the reference signal pattern using joint indication information.

In order to obtain better channel estimation performance, the DMRS can be divided into multiple subsets, and the time domain spacing between two DMRS sets can also be notified along with the slot mechanism through joint information. Optionally, each DMRS subset includes the same DMRS pattern. For example, in the case of only two DMRS subsets, in a slot including only 7 time domain symbols, the time domain spacing between two DMRS subsets is D_A, and in a slot including 14 time domain symbols, the time domain spacing between two DMRS subsets is D B, D_A being less than D B. Since the 7-symbol slot is short and the 14-symbol slot is long, the spacing of DMRS subsets corresponding to the short slot is smaller than the spacing of DMRS subsets corresponding to the long slot.

After the number of DMRS subsets is determined, the positions of the DMRS subsets or the positions of the high layer signaling-configured DMRS subsets may be pre-defined for different slot structures, such that the base station can notify the slot structure and the positions of the DMRS subsets using joint information.

Figure 9:
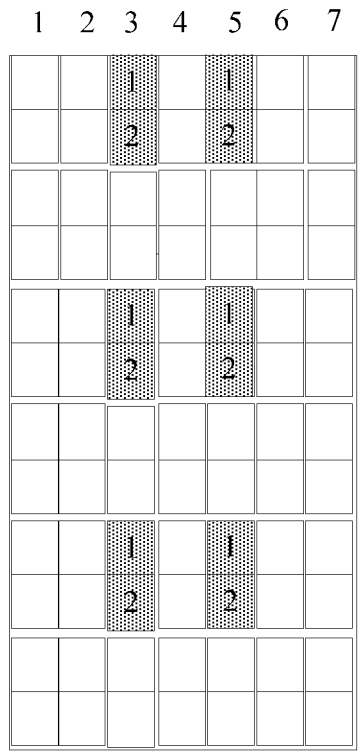
FIG. 9 is a schematic diagram of different slot structures corresponding to different DMRS subset spacing according to an embodiment of the present disclosure.
Figure 9:
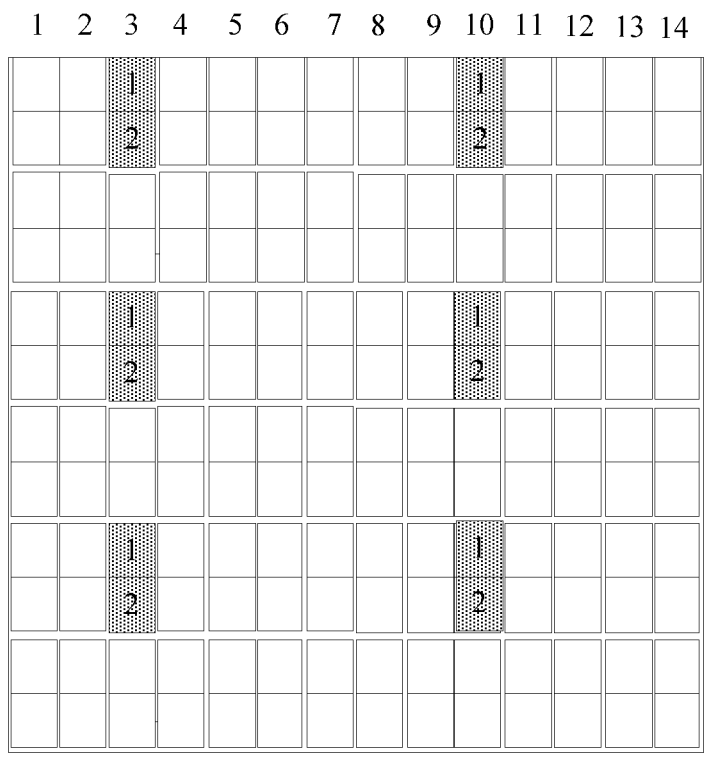

As shown in FIG. 9, if the number of DMRS subsets is 2, the base station can use joint signaling 1 bit, wherein 0 represents a slot structure of 7 symbols and the positions of two DMRSs are represented by symbols 3, 5; and 1 represents a slot structure of 14 symbols and the positions of two DMRS subsets are represented by 3, 10, respectively. At the same time, it can be seen that the spacing between the positions of two DMRS subsets in a 7-symbol slot is 2, while the spacing between the positions of two DMRS subsets in a 14-symbol slot is 7, which is larger.

A DMRS subset may be viewed as a DMRS transmitted on one or two consecutive OFDM symbols, or may be a period of DMRS transmission. As shown in the left figure of FIG. 9, the first subset of DMRS is mapped to the third symbol, the second subset is mapped to the fifth symbol, and in the third and fifth symbols all DMRS ports are completely transmitted. That is to say, the resource positions to which the plurality of DMRS subsets are mapped in the frequency domain are the same, that is, mapped to the same ports, except that the time of mapping is different. It can be seen that the DMRS pattern on symbol 5 is a repetition of symbol 3, except that is has been mapped to a different time domain symbol. It should be noted that the method according to the embodiment of the present disclosure may be applied to a case of multiple DMRS subsets.

Different numbers of DMRS time domain symbols, DMRS subset position, spacing, port number, port sequence number, etc. all belong to DMRS pattern, so in general, the base station can use joint indication information to notify the user terminal of the slot structure and the DMRS pattern. Therefore, the embodiment of the present disclosure also includes a case where the base station can use joint indication information to notify the user terminal of the slot structure and the DMRS sequence number and/or the sequence of the reference signal (including the scrambling sequence, OCC orthogonal sequence, etc.).

The slot structure refers to a total number of symbols included in the slot, a guard period, and a number of uplink transmission symbols. When the DMRS pattern includes a plurality of subsets and the slot structures are different, the position of time domain of the last DMRS subset is different.

For downlink transmission, optionally, in order to combat Doppler shift, the downlink DMRS preferably includes a plurality of subsets, such as shown in FIG. 9, the DMRS includes two subsets. At this time, the further the position of the second subset is, the better the channel estimation performance would be. However, due to different slot structures, the last two time domain symbols of some slots are guard periods and time domain symbols for uplink transmission, hence the last two time domain symbols cannot be used for transmission of downlink DMRS. That is to say, the second subset of the DMRS cannot be located in the last two time domain symbols of the slot. The last N time domain symbols of some slots cannot be used to transmit downlink DMRS, that is, the second subset of DMRS cannot be located on the last two time domain symbols of the time slot. Some slots do not include guard periods or uplink time domain symbols. Therefore, different slot structures may result in different positions of time domains of the second subset of the DMRS. At this time, the relationship bounded between the slot structure and the positions of the time domains of the second subset may be predefined, such that the time domain position of the second subset can be notified to the user without the need of an additional signaling, it is the base station that uses joint information to indicate the time domain position of the second subset of the DMRS and the slot structure. For example, as pre-defined, in a slot structure, when the total number of guard periods and uplink time domain symbols is less than or equal to 2, the last time domain symbol of the last subset of the DMRS is located on symbol 12 (as shown in FIG. 9, the 12th symbol); when the total number of guard periods and uplink time domain symbols is greater than 2, if the DMRS has two last subsets, then the last time domain symbol of the last subset is located on the previous time domain symbol of the guard period time domain symbol, that is, the last time domain symbol of the last subset is located on the last symbol of the downlink region of the slot. For example, if the total number of the guard periods and uplink time domain symbols is 4, then the last time domain symbol of the second subset (each subset may include two time domain symbols) is located on symbol 10 (see FIG. 9).

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Fifth Embodiment

The embodiment of the present disclosure provides a signaling indication method that may include: transmitting joint indication information from a first communication node to a second communication node.

Optionally, in one or more DMRS patterns, the seventh and tenth DMRS ports are mapped in the same resource position, an eighth and eleventh ports of the DMRS are mapped to the same resource position, and the ninth and twelfth DMRS ports are mapped to the same resource position;

Wherein, the one or more DMRS patterns can support DMRS having a maximum of 12 ports on two consecutive OFDM symbols.

In the embodiment of the present disclosure, the sequence numbers p #1, p #2, p #3 . . . p #12 of the DMRS ports are not absolute port sequence numbers, they may be considered as p #(1+m), p #(2+m), p #(3+m) p #(12+m), wherein m is an integer.

Figure 10:
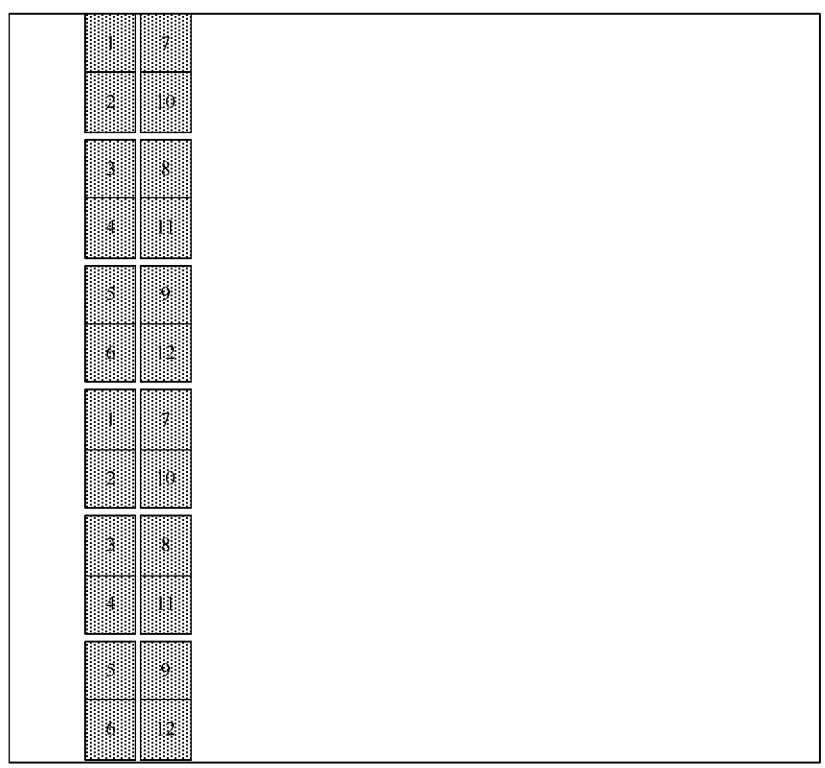
FIG. 10 is a schematic diagram of pattern 7a according to an embodiment of the present disclosure.
Figure 11:
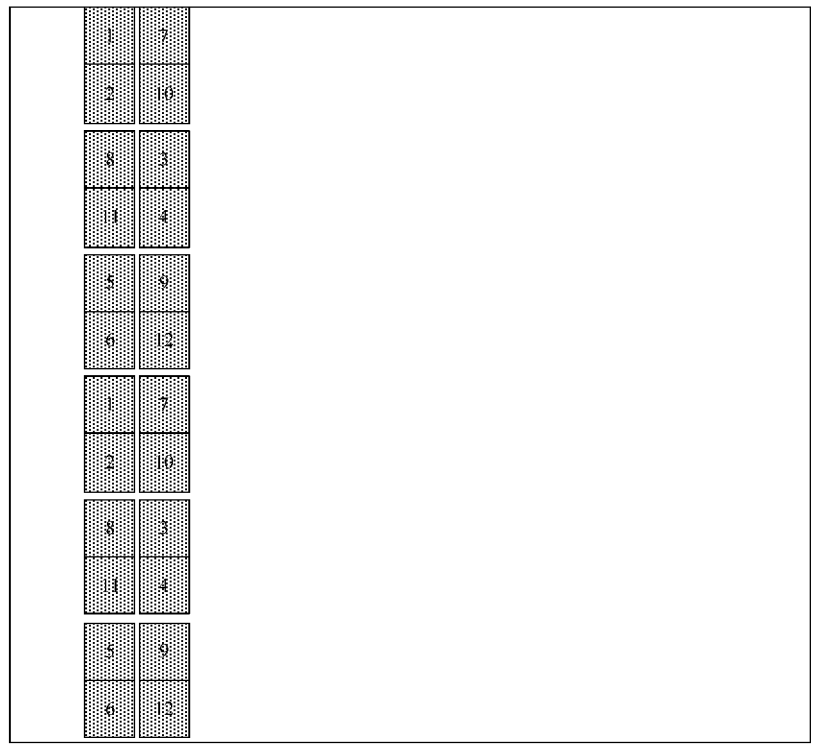
FIG. 11 is a schematic diagram of pattern 7b according to an embodiment of the present disclosure.
Figure 12:
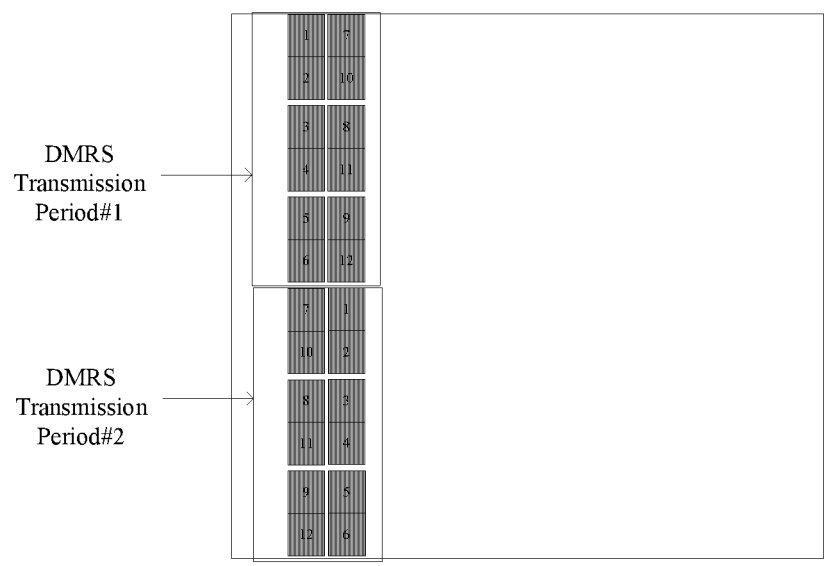
FIG. 12 is a schematic diagram of pattern 7c according to an embodiment of the present disclosure.
Figure 13:
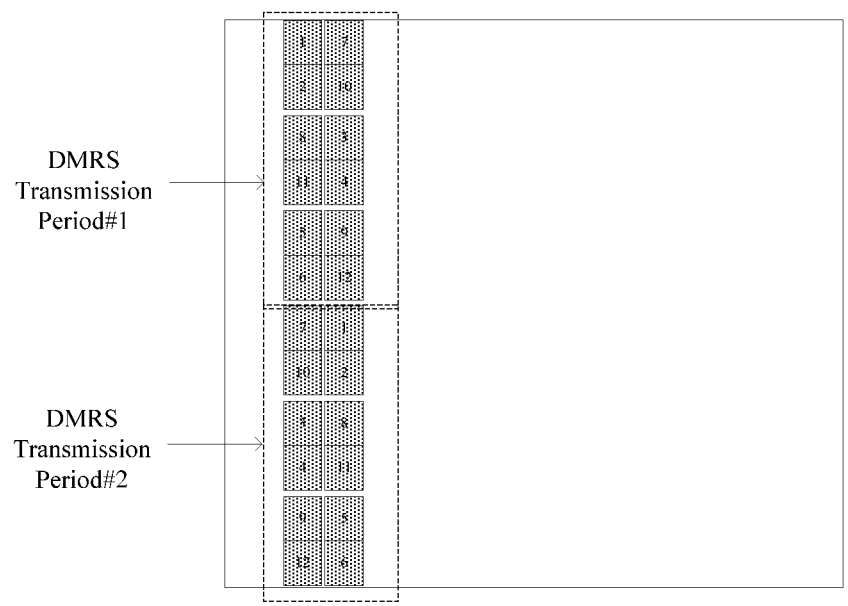
FIG. 13 is a schematic diagram of pattern 7d according to an embodiment of the present disclosure.

As shown in FIG. 10, FIG. 11 and FIG. 12, every two DMRS ports are code division multiplexed on two REs (resource particle pair) in adjacent frequency domains, for example, ports p #1, p #2 are code division multiplexed on two subcarriers in adjacent frequency domains, p #1 may use OCC sequence [1 1] or [1 -1] while p #2 may use OCC sequence [1 -1] or [1 1]; p #3, p #4 are code division multiplexed on two subcarriers in adjacent frequency domains, p #3 may use OCC sequence [1 1] or [1 -1] while p #4 may use OCC sequence [1 -1] or [1 1]; p #5, p #6 are code division multiplexed on two subcarriers in adjacent frequency domains, p #5 may use OCC sequence [1 1] or [1 -1] while p #6 may use OCC sequence [1 -1] or [1 1]; p #7, p #10 are code division multiplexed on two subcarriers in adjacent frequency domains, p #7 may use OCC sequence [1 1] or [1 -1] while p #10 may use OCC sequence [1 -1] or [1 1]; p #8, p #11 are code division multiplexed on two subcarriers in adjacent frequency domains, p #8 may use OCC sequence [1 1] or [1 -1] while p #11 may use OCC sequence [1 -1] or [1 1]; p #9, p #12 are code division multiplexed on two subcarriers in adjacent frequency domains, p #9 may use OCC sequence [1 1] or [1 -1] while p #12 may use OCC sequence [1 -1] or [1 1]. That is to say, p #1, p #2 are mapped to the same resource position, p #3, p #4 are mapped to the same resource position, p #5, p #6 are mapped to the same resource position, p #7, p #10 are mapped to the same resource position, p #8, p #11 are mapped to the same resource position, p #9, p #12 are mapped to the same resource position. As can be seen from the pattern in the figures, the pattern of these screenshot reference signals can support 12-port DMRS in one PRB by using two OFDM symbols.

In a possible implementation manner, plurality of DMRS ports may be time division multiplexed on different OFDM symbols, as shown in FIG. 10, FIG. 11, and FIG. 12, p #1, p #2, and p #7, p #10 are time division multiplexed, that is to say, p #1, p #2 and p #7, p #10 occupy different resource particle pairs. Similarly, p #3, p #4 and p #8, p #11 are time division multiplexed, and p #5, p #6 and p #9, p #11 are time division multiplexed.

Optionally, in a possible implementation manner, a plurality of DMRS ports may be code division multiplexed on different OFDM symbols, as shown in FIG. 10, FIG. 11, and FIG. 12, p #1, p #2, p #7, p #10 are code division multiplexed, p #1, p #2, p #7, p #10 occupy two resource particle pairs (resource particle groups) in adjacent time domains. P #1, p #2, p #7, and p #10 can be distinguished by using different OCC sequences. At this time, p #1, p #2, p #7, p #10 occupy the same resource position (4 adjacent REs), that is, the same resource particle group. Similarly, p #3, p #4, p #8, p #11 are code division multiplexed, p #3, p #4, p #8, p #11 occupy two resource particle pairs (resource particle groups) in adjacent time domains. At this time, p #3, p #4, p #8, p #11 occupy the same resource position. Similarly, p #5, p #6, p #9, p #12 are code division multiplexed, p #5, p #6, p #9, p #12 occupy two resource particle pairs (resource particle groups) in adjacent time domains. At this time, p #5, p #6, p #9, and p #12 occupy the same resource position.

In the embodiment of the present disclosure, the reference signal pattern supports a maximum of 12 ports, but it does not mean that the base station must be configured with 12 ports, and which is particularly suitable for multi-user terminal scheduling. For example, the base station schedules 6 user terminals on the same time-frequency resource, and each user terminal is configured with two DMRS ports, a total of 12 ports. Of course, the total number of ports may be less than 12. For example, the base station schedules five user terminals U1, U2, U3, U4, and U5, and the number of ports respectively allocated thereto is (p #1, p #2), (p #3, p #4), (p #5, p #6), (p #7, p #8), p #9, a total of 9 ports. For the first solution where the multiple ports are time division multiplexed on different time domain OFDM symbols and the total number of ports is less than 12, the pattern 7a (as shown in FIG. 10) would cause power non-equalization on two adjacent OFDM symbols. As shown in FIG. 10, p #1, p #2, p #3, p #4, p #5, p #6 are mapped to the first OFDM symbol in the DMRS position, and since there are only 9 ports in total, so p #7, p #8, p #9 are mapped to the second OFDM symbol. If the base station transmits the DMRS with full power, the power of p #7, p #8, and p #9 would be much larger than that of p #1, p #2, p #3, p #4, p #5, and p #6.

In order to solve the above power non-equalization problem, the resource positions to which p #3, p #4 are mapped and the resource positions to which p #8, p #11 are mapped can be swapped based on FIG. 10. As shown in FIG. 11, ports p #3, and p #4 are mapped to the second time domain symbol of the DMRS, and p #8, p #11 are mapped to the first time domain symbol of the DMRS. In this pattern, p #1, p #2, p #8, p #11, p #5, p #6 are mapped to the same OFDM symbol, and p #7, p #10, p #3, p #4, p #9, p #12 are mapped to the same OFDM symbol.

Optionally, in order to solve the above power non-equalization problem, in an adjacent frequency domain transmission period, the mapping of the DMRS ports is swapped on two adjacent OFDM symbols, wherein one frequency domain transmission period refers to a frequency domain resource range within which the largest number of DMRS ports supported by the DMRS pattern are mapped. As shown in FIG. 12, one frequency domain transmission period includes 6 adjacent subcarriers. And one time-frequency domain transmission period includes 6 adjacent subcarriers and 12 REs on two adjacent OFDM symbols. As shown in FIG. 12, p #1, p #2, p #3, p #4, p #5, p #6 are mapped to the first OFDM symbol in the DMRS region in the first time-frequency domain transmission period, and mapped to the second OFDM symbol in the DMRS region in the second time-frequency domain transmission period. Similarly, p #7, p #10, p #8, p #11, p #9, p #12 are mapped to the second OFDM symbol in the DMRS region in the first time-frequency domain transmission period, and mapped to the first OFDM symbol in the DMRS region in the second time-frequency domain transmission period. That is to say, during two adjacent frequency domain transmission periods, the DMRS ports are mapped on different OFDM symbols.

Of course, the power non-equalization problem can also be solved based on FIG. 11 in combination with the method as shown in FIG. 12 where the mapping of the DMRS ports is swapped on two adjacent OFDM symbols in the adjacent frequency domain transmission period. In pattern 7d, in the first frequency domain transmission period, ports p #3, p #4 are mapped on the second time domain symbol of the DMRS, and p #8, p #11 are mapped on the first time domain symbol of the DMRS, and within the frequency domain transmission period #2, the mapping of the DMRS ports is swapped on two adjacent OFDM symbols.

In the embodiment of the present disclosure, the first OFDM symbol of the DMRS is not the first OFDM symbol in one slot, but the first OFDM symbol on which the DMRS is placed. The patterns described above can all support a maximum of 12 DMRS ports, but in practice, for the sake of simplicity, the standard only supports one.

If one or more DMRS patterns support a maximum of 8 ports, port 1 and port 2 are mapped to the same resource position, port 3 and port 4 are mapped to the same resource position, port 5 and port 7 are mapped to the same resource position, and port 6 and port 8 are mapped to the same resource position, wherein one or more DMRS patterns can support a DMRS of a maximum of 8 ports on two consecutive OFDM symbols. The maximum of 8 ports may be assigned to one user terminal or to multiple user terminals.

Figure 14:
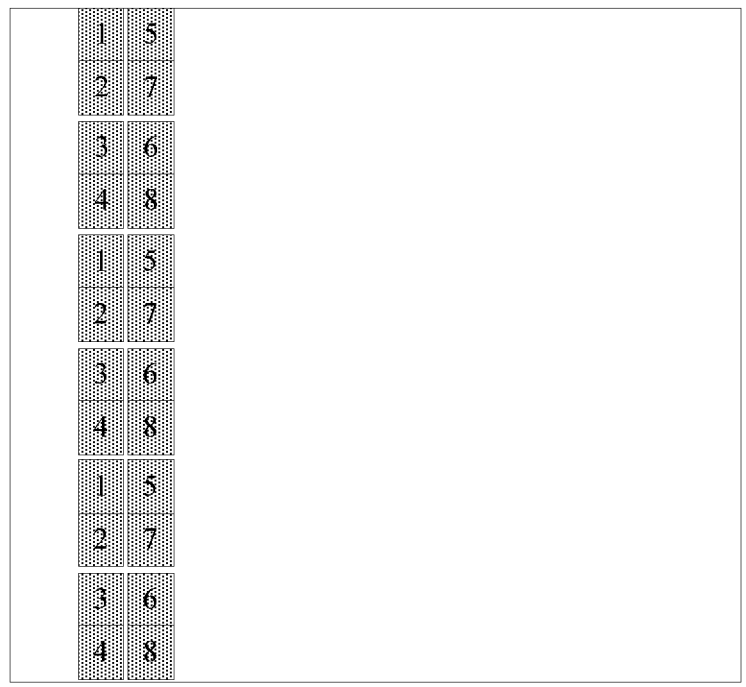
FIG. 14 is a schematic diagram of pattern 8a according to an embodiment of the present disclosure.
Figure 15:
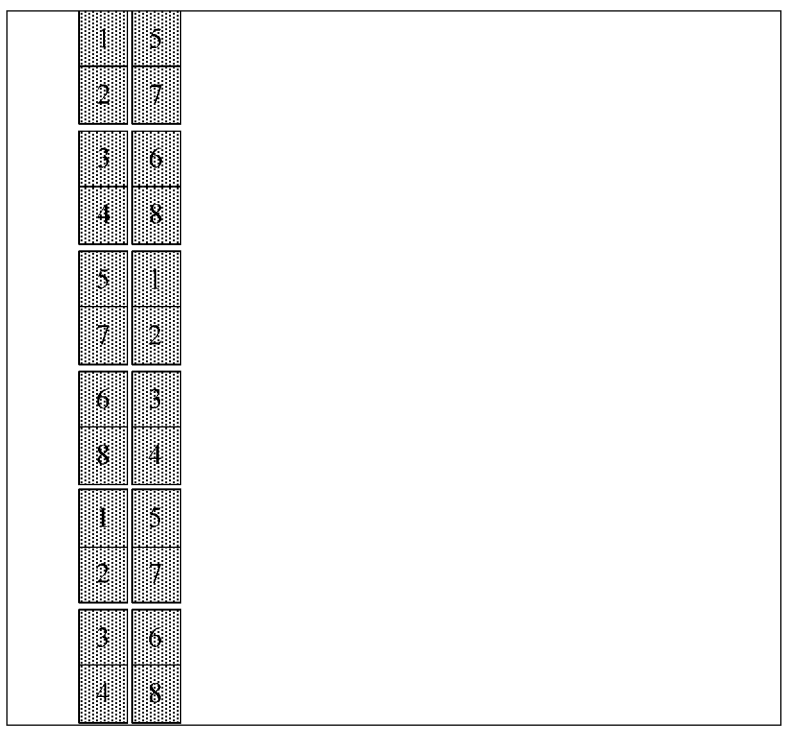
FIG. 15 is a schematic diagram of pattern 8b according to an embodiment of the present disclosure.
Figure 16:
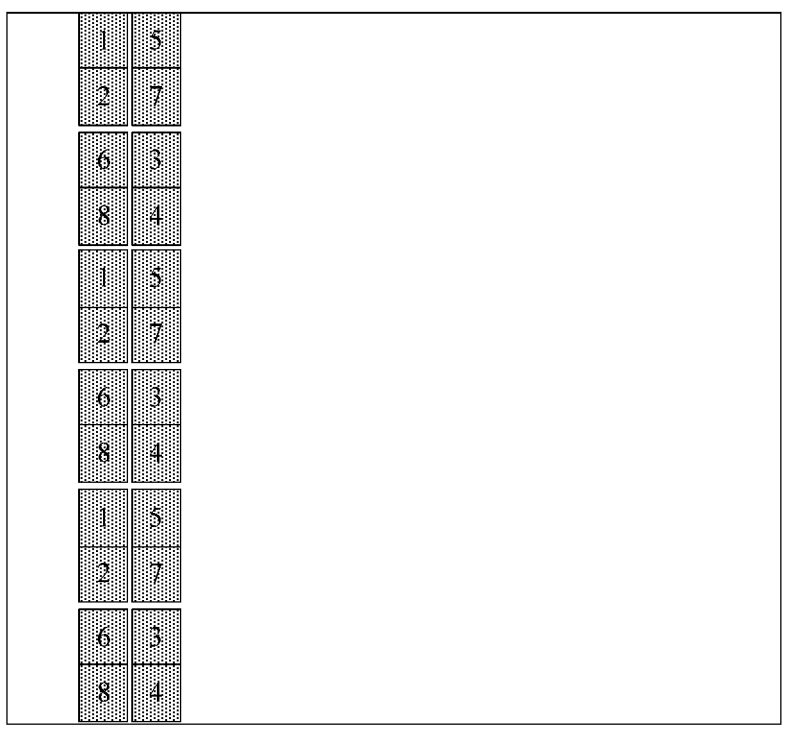
FIG. 16 is a schematic diagram of pattern 8c according to an embodiment of the present disclosure.
Figure 17:
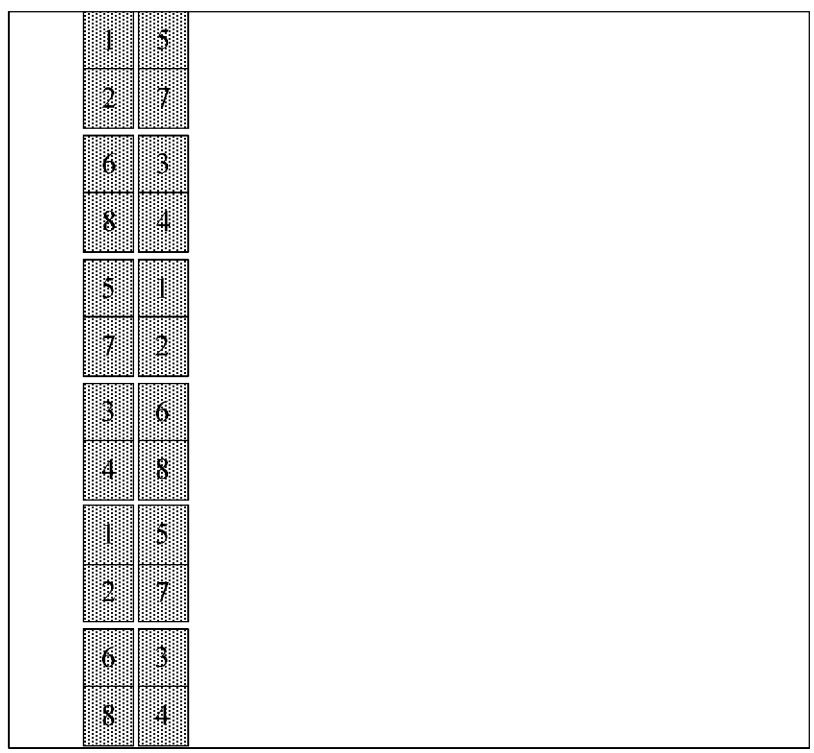
FIG. 17 is a schematic diagram of pattern 8d according to an embodiment of the present disclosure.

As shown in FIG. 14, if the number of ports actually scheduled by the base station is less than 8, such as 5 ports, since p #1, p #2, p #3, and p #4 are all mapped to the first OFDM symbol of the DMRS, and only port 5 is mapped to the second OFDM symbol, there would also be a problem of power non-equalization. In order to solve the above power non-equalization problem, in the adjacent frequency domain transmission period, the mapping of the DMRS ports is swapped on two adjacent OFDM symbols, as shown in FIG. 15. Alternatively, as shown in FIG. 16, in order to solve the power non-equalization problem, in a frequency domain transmission period, p #1, p #2, p #6, p #8 are mapped on the same OFDM symbol, and p #3, p #4, p #5, p #7 are mapped on the same OFDM symbol. Of course, the method of swapping the mapping of DMRS ports on two adjacent OFDM symbols in a different frequency domain transmission period may be combined, as shown in FIG. 17.

Optionally, within the physical transmission resource in adjacent frequency domains, mapping of the DMRS ports is swapped on two adjacent OFDM symbols.

Figure 18:
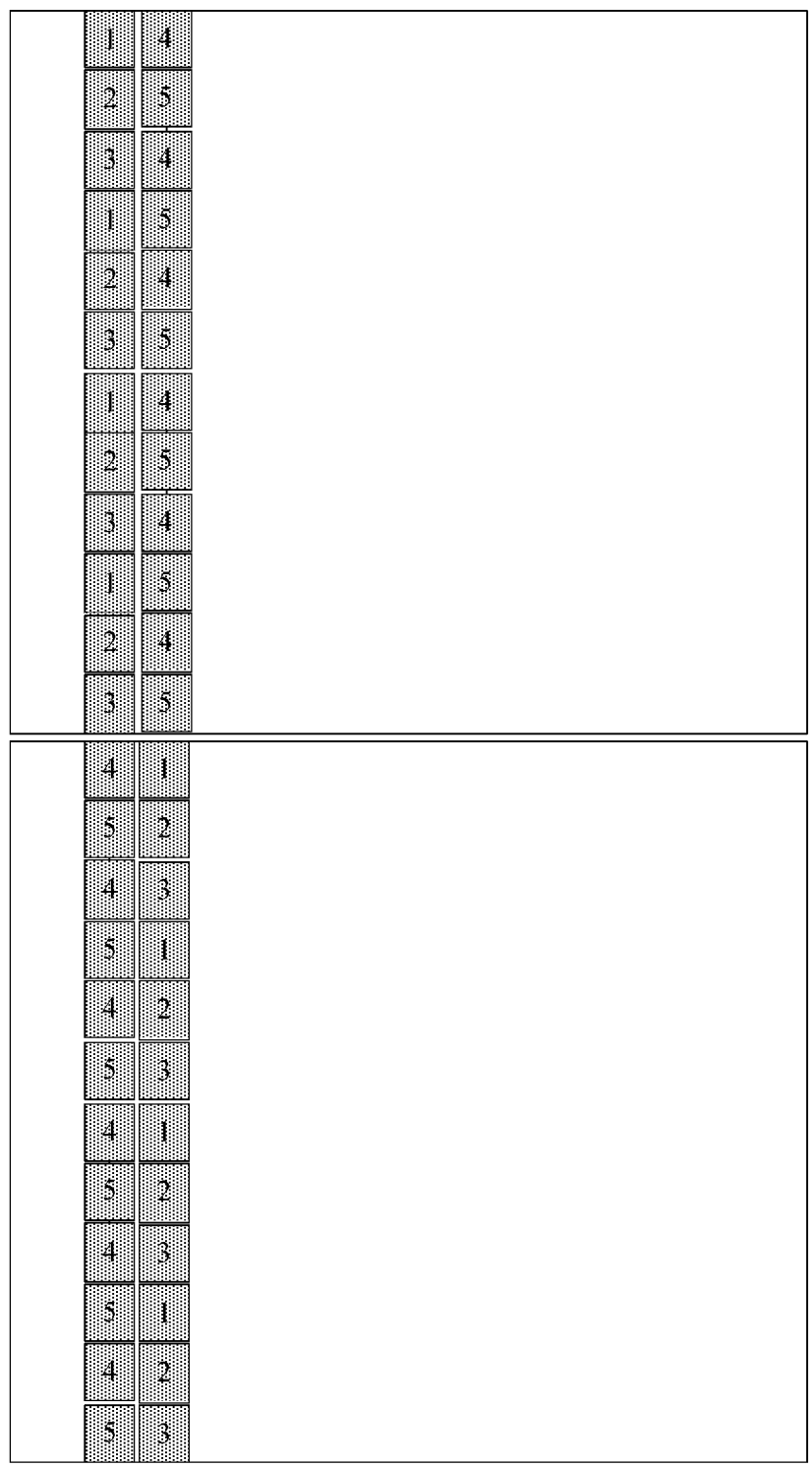
FIG. 18 is a schematic diagram of a pattern 8e according to an embodiment of the present disclosure.

If the DMRS pattern is based on IFDMA scheme, each DMRS port is mapped by every number m of REs on the frequency domain resource particle. As shown in FIG. 18, on one OFDM symbol, DMRS ports 1, 2, and 3 are mapped by every three REs, and ports 4 and 5 are mapped by every two REs. In order to solve the problem of power non-equalization, within two PRBs in adjacent frequency domains, the mapping of the DMRS ports is swapped on two adjacent OFDM symbols. As can be seen from the figure, within the PRB above, ports 1, 2, and 3 are mapped on the first OFDM symbol, and ports 4 and 5 are mapped within the second PRB; within the PRB below, ports 1, 2, and 3 are mapped on the second OFDM symbol, and ports 4 and 5 are mapped within the first PRB.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Sixth Embodiment

The embodiment of the present disclosure provides a signaling indication method that may include: a first communication node notifying a total number of resource particle pairs or a number of resource particle groups of the DMRS in a transmission frequency domain period. Wherein, a resource particle pair refers to a combination of two adjacent resource particles in the frequency domain, a resource particle group refers to a combination of two resource particle pairs in adjacent time domains.

In the embodiment of the present disclosure, the first communication node may be a base station, and the second communication node may be a terminal, i.e., the base station transmits joint indication information to the terminal.

In the embodiment of the present disclosure, the higher layer signaling may be RRC signaling and MAC signaling, or may be a set of RRC signaling and MAC signaling.

Figure 19:
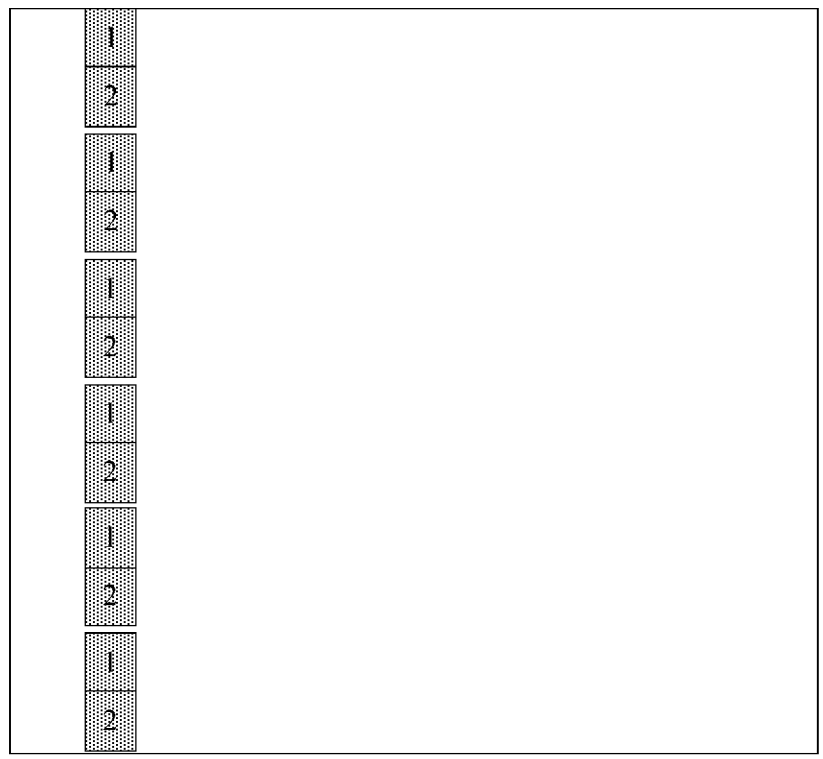
FIG. 19 is a schematic diagram of pattern 9a according to an embodiment of the present disclosure.
Figure 20:
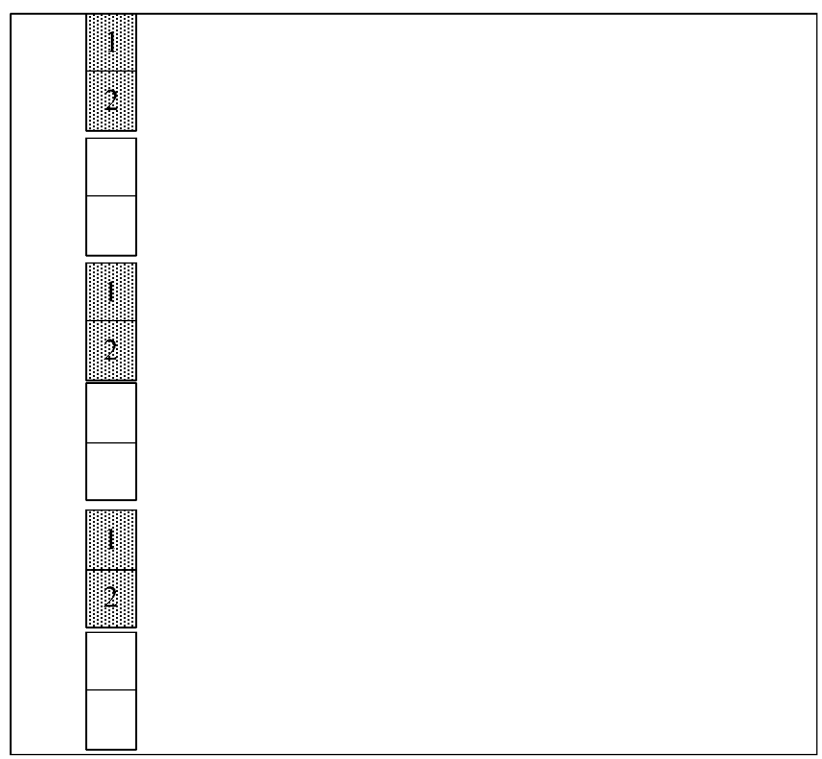
FIG. 20 is a schematic diagram of pattern 9b according to an embodiment of the present disclosure.
Figure 21:
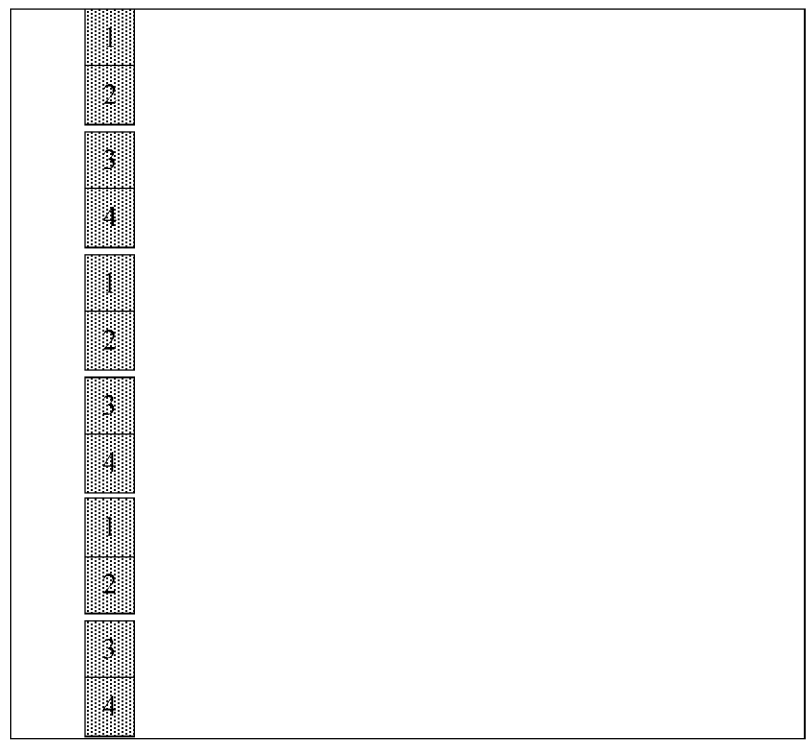
FIG. 21 is a schematic diagram of pattern 10a according to an embodiment of the present disclosure.

If different ports are time division multiplexed on adjacent OFDM symbols, the base station may indirectly notify the user terminal of the DMRS pattern by notifying the number of resource particle pairs. It can be seen from the pattern of FIG. 12 described above that if the DMRS supports a maximum of 12 orthogonal ports, the number of resource particle pairs occupied by all ports in one frequency domain transmission period would be 6, this is because ports p #1, p #2, p #3, p #4, p #5, p #6, p #7, p #8, p #9, p #10, p #11, p #12 occupy 12 REs, i.e., 6 resource particle pairs in one frequency domain period. Similarly, in FIG. 14 to FIG. 18, the maximum number of resource particle pairs able to be supported is 4. As shown in FIG. 19 and FIG. 20, the number of resource particle pairs supported by the DMRS pattern in one frequency domain transmission period is 1, that is, a maximum of 2 orthogonal ports are supported. The number of resource particle pairs supported by the DMRS pattern in FIG. 21 and FIG. 3 in a frequency domain transmission period is 2, that is, a maximum of 4 orthogonal ports are supported.

If different ports are code division multiplexed on adjacent OFDM symbols, the base station may indirectly notify the user terminal of the DMRS pattern by notifying the number of resource particle group. As can be seen from the pattern of FIG. 12 described above, if the DMRS supports a maximum of 12 orthogonal ports, the number of resource particle groups occupied by all ports in one frequency domain transmission period is 3. Similarly, in FIG. 14, the maximum number of resource particle groups supported is 2. For FIG. 19, FIG. 20, FIG. 21, and FIG. 2, the number of resource particle groups is 1.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Seventh Embodiment

In NR, one data layer group may correspond to one Modulation Code Scheme (MCS), but in the case of closed-loop spatial multiplexing, a data layer corresponds to a DMRS port, i.e., a user terminal, the number of DMRS ports and the number of data layers are in a one-to-one correspondence relation. If the number of data layers is small, that is, the number of data layer groups is small, the base station needs less information bits to notify the user terminal of the MCS, that is, when the number of DMRS ports is small, the base station needs less information bits for dynamic MCS notification. If the number of DMRS ports is large, the corresponding number of data layer groups is large, and then the base state needs more information bits for MCS notification. At this time, if the MCS and DMRS ports, numbers, patterns, and information alike are separately configured, it is necessary to assume a maximum number of data layer groups to reserve MCS information bits. For example, if a user terminal can support a maximum of 8 layers, and the number of layer groups is 2, each data layer group includes 4 layers corresponding to 4 DMRS ports, and M bits are required to notify the MCS of each layer group, then the base station needs to reserve 10 bits in the DCI for possible MCS notification. However, if only 4 layers are assigned to the user terminal during practical scheduling, then only 5 bits are required for MCS notification, thus the excessive 5 bits would be wasted.

That is to say, the base station can indicate the DMRS information and the MCS information through indication bits of the joint indication information. Wherein, the DMRS port information includes the number of DMRS ports (corresponding to the number of layers of data transmission), the port sequence number, the DMRS pattern, the scrambling ID, etc., and the number of DMRS ports supported by different DMRS patterns may be different. And the MCS information indication includes the coding scheme and the modulation scheme.

Table 2 describes the method by which the base station indicates the DMRS information and the MCS information through joint information indication bits, each indication bit carrying the DMRS information and the MCS information. In Table 2, it is assumed that there are only one MCS configured for 4 DMRS ports (4 layers) and less, and two MCSs are configured for more than 4 DMRS ports. In other words, one codeword stream or TB block corresponds to a maximum of 4 data layers a maximum of 4 DMRS ports. If the user terminal is assigned with more than 4 DMRS ports, it is preferred that two codeword streams include the same or proximate numbers of DMRS ports. A CW represents one codeword, i.e., a data stream. Patterns A, B . . . X correspond to different DMRS patterns. It can be seen from the Table that when the number of layers is less than or equal to 4, only M bits are needed for MCS notification, assuming M=5; when the number of layers is greater than 4, 10 bits are needed to notify the MCS with two data streams. However, when the number of DMRS is relatively large, that is, when the number of layers is large, the number of DMRS patterns is small, and only $n_{SCID}=0$ is required, and $n_{SCID}=1$ is not required, so the number of bits required for the DMRS information notification is less, joint notification of the MCS and DMRS pattern, the port sequence number, the number of ports, the scrambling ID and the like would save the total number of indication bits, thereby saving the dynamic signaling overhead. As shown in the Table, the reference numeral of the indication bits starts from 0 and increases upwards.

TABLE 2

Joint Notification of MCS and DMRS Information

| Indication Bit | Layers, DMRS Port/Pattern/ Scrambling | MCS |
|---|---|---|
| 0 | 1 layers, port 1, pattern A1, $n_{SCID}=0$ | 1CW, $MCS_0$ (M bits) |
| 1 | 1 layers, port 1, pattern A1, $n_{SCID}=1$ | 1CW, $MCS_0$ (M bits) |
| 2 | 1 layers, port 2, pattern A1, $n_{SCID}=0$ | 1CW, $MCS_0$ (M bits) |
| 3 | 1 layers, port 2, pattern A1, $n_{SCID}=1$ | 1CW, $MCS_0$ (M bits) |
| . | . . . | |
| . | 1 layers, port $x_1$, pattern X1, $n_{SCID}=0$ | 1CW, $MCS_0$ (M bits) |
| . | 1 layers, port $x_1$, pattern X1, $n_{SCID}=1$ | 1CW, $MCS_0$ (M bits) |
|  | 2 layers, port 1, 2, pattern A2, $n_{SCID}=0$ | 1CW, $MCS_0$ (M bits) |
|  | 2 layers, port 1, 2, pattern A2, $n_{SCID}=1$ | 1CW, $MCS_0$ (M bits) |
|  | . . . | |
|  | 2 layers, port $x_1$, $x_1+1$ pattern X2, $n_{SCID}=0$ | 1CW, $MCS_0$ (M bits) |
|  | 2 layers, port $x_1$, $x_1+1$ pattern X2, $n_{SCID}=1$ | 1CW, $MCS_0$ (M bits) |
|  | 3 layers, port 1, 2, 3 pattern A3, $n_{SCID}=0$ | 1CW, $MCS_0$ (M bits) |
|  | . . . | |
|  | 4 layers, port $x_1$, $x_1+1$, $x_1+2$, $x_1+3$ pattern X3, $n_{SCID}=0$ | 1CW, $MCS_0$ (M bits) |
|  | 5 layers, port 1-5, pattern A5, $n_{SCID}=0$, wherein $MCS_0$ and $MCS_1$ correspond to 3 layers and 2 layers, respectively. | 2CW, $MCS_0$ (M bits) $MCS_1$ (M bits) |
|  | . . . | |
|  | 5 layers, port 1-5, pattern X5, $n_{SCID}=0$ | 2CW, $MCS_0$ (M bits) $MCS_1$ (M bits) |
|  | 6 layers, port 1-5, pattern A6, $n_{SCID}=0$, wherein $MCS_0$ and $MCS_1$ respectively correspond to 3 layers | 2CW, $MCS_0$ (M bits) $MCS_1$ (M bits) |
|  | . . . | |
|  | 8 layers, port 1-8, pattern X8, 2CW, $n_{SCID}=0$, wherein $MCS_0$ and $MCS_1$ respectively correspond to 4 layers | 2CW, $MCS_0$ (M bits) $MCS_1$ (M bits) |

Further, since PTRS has close relation to DMRS and the ports are in a corresponding relationship, overhead can be effectively saved by the base station notifying information on DMRS, PTRS, and MCS using joint information.

When the joint indication information includes data modulation scheme, a plurality of data modulation schemes corresponding to the same codeword are indicated in a differential manner;

when the joint indication information includes data coding scheme, a plurality of data coding schemes corresponding to the same codeword are indicated in a differential manner; and when the joint indication information includes data modulation and coding scheme, a plurality of data modulation and coding schemes corresponding to the same codeword are indicated in a differential manner.

When the same codeword corresponds to a coding scheme, a modulation scheme corresponding to a plurality of transmission layers is indicated in a differential manner.

It is assumed in Table 2 that the same data stream (codeword or TB) only needs to notify one MCS value, and it is assumed that 4 data layers correspond to one MCS. At this time, if the channel conditions of multiple data layers, that is, a plurality of DMRS ports, are significantly different, notification of only one MCS in one data stream corresponding to multiple data layers would bring forth performance loss. Therefore, the base station may notify the user terminal that multiple MCS values is supplied to multiple data layers included in a data stream. Assuming that a plurality of data layers included in one data stream are divided into several data layer groups, and each data layer group notifies one MCS, so that MCS information between the plurality of data layer groups can be notified in a differential manner. For example, a data stream includes 4 data layers, and every 2 layers are a data layer group, so that the base station only needs M bits to notify the MCS of the first data layer group. For the second layer group, the base station only needs to notify a deviation value Ai (with O bits), wherein O is smaller than M. When scheduling is implemented, the base station may always arrange in a predefined manner the data layer with better channel conditions in the first data layer group, so that the MCS value of the second data layer group should always be smaller than the MCS of the first data layer group, then it can be understood that Ai is always a negative number or zero. On the contrary, if the base station always arrange in a predefined manner the data layer with better channel conditions as the latter data layer group, so that the MCS value of the second data layer group should always be greater than the MCS of the first data layer group, then it can be understood that Ai is always a positive number or zero.

Therefore, it can also be said when the joint indication information includes data modulation and coding scheme, the multiple modulation and coding schemes corresponding to the same codeword may be indicated in a differential manner, that is, for multiple modulation and coding values corresponding to the same codeword, the base station notifies an absolute value indication of the modulation and coding scheme, and for indication of other modulation and coding schemes, the base station notifies a relative deviation value, which may be a non-negative number or a non-positive number.

Of course, one data layer group may include multiple or one data layer. Exemplarily, as shown in Table 3, one data layer group includes one data layer, so that each data layer requires MCS notification. In each data stream, the corresponding multiple data layers can be notified by notifying the deviation value, which can save dynamic signaling overhead. In Table 3, different $n_{SCID}$ are not separately listed for each indication bit for the sake of convenience. In practice, different indication bits are needed to distinguish different $n_{SCID}$. Similarly, the indication bits of different MCSs are not listed separately. In practical notification, different indication bits are needed to distinguish different MCS values, as shown in Table 4, which corresponds to value 0 in practice, and assuming $M=5$, $2^5=32$ indication bits are needed to distinguish different MCS indication bits, plus different $n_{SCID}$, a total of 64 indication bits are needed. So, for Table 3, the actual reference numeral for value 1 starts from 64.

TABLE 3

| Indication Bit | Layers, DMRS Port/Pattern/Scrambling | MCS |
|---|---|---|
| 0 | 1 layers, port 1, pattern A, 1CW, $n_{SCID} = 0/1$ | $MCS_0$ (M bits) |
| 1 | 1 layers, port 2, pattern A, 1CW, $n_{SCID} = 0/1$ | $MCS_0$ (M bits) |
| 2 | . . . | |
| 3 | 1 layers, port n, pattern X, 1CW, $n_{SCID} = 0/1$ | $MCS_0$ (M bits) |
| 4 | 2 layers, port 1, 2, pattern A, 1CW, $n_{SCID} = 0/1$ | $MCS_0$ (M bits) + $\Delta_1$(O bits) |
| 5 | 2 layers, port 3, 4, pattern A, 1CW, $n_{SCID} = 0/1$ | $MCS_0$ (M bits) + $\Delta_1$(O bits) |
| 6 | . . . | |
| 7 | 2 layers, port nx, ny, pattern X, 1CW, $n_{SCID} = 0/1$ | $MCS_0$ (M bits) + $\Delta_1$(O bits) |
| 8 | 3 layers, port 1-3, pattern A, 1CW, $n_{SCID} = 0$ | $MCS_0$ (M bits) + $\Delta_1$(O bits) + $\Delta_2$(O bits) |
| 9 | . . . | |
| 10 | 3 layers, port 1-3, pattern X, 1CW, $n_{SCID} = 0$ | $MCS_0$ (M bits) + $\Delta_1$(O bits) + $\Delta_2$(O bits)+ |
| 11 | 4 layers, port 1-4, pattern A, 1CW, $n_{SCID} = 0$ | $MCS_0$ (M bits) + $\Delta_1$(O bits) + $\Delta_2$(O bits) + $\Delta_3$(O bits)+ |
| 12 | . . . | |
| 13 | 4 layers, port 1-4, pattern X, 1CW, $n_{SCID} = 0$ | $MCS_0$ (M bits) + $\Delta_1$(O bits) + $\Delta_2$(O bits) + $\Delta_3$(O bits)+ |
| 14 | 5 layers, port 1-5, pattern A, 2CW, $n_{SCID} = 0$ | $MCS_0$ (M bits) + $\Delta_{01}$(O bits) + $\Delta_{02}$(O bits) + $MCS_1$ (M bits) + $\Delta_{11}$(O bits)+ |
| 15 | . . . | |
| 16 | 5 layers, port 1-5, pattern X, 2CW, $n_{SCID} = 0$ | $MCS_0$ (M bits) + $\Delta_{01}$(O bits) + $\Delta_{02}$(O bits) + $MCS_1$ (M bits) + $\Delta_{11}$(O bits)+ |
| 17 | 6 layers, port 1-5, pattern A, 2CW, $n_{SCID} = 0$ | $MCS_0$ (M bits) + $\Delta_{01}$(O bits) + $\Delta_{02}$(O bits) + $MCS_1$ (M bits) + $\Delta_{11}$(O bits) + $\Delta_{12}$(O bits)+ |
| 18 | . . . | |
| 19 | 6 layers, port 1-5, pattern X, 2CW, $n_{SCID} = 0$ | $MCS_0$ (M bits) + $\Delta_{01}$(O bits) + $\Delta_{02}$(O bits) + $MCS_1$ (M bits) + $\Delta_{11}$(O bits) + $\Delta_{12}$(O bits)+ |
| . . . | | |

TABLE 4

Explanation on Indication Bits in Table 3

| Indication Bit | Layers, DMRS Port/Pattern/ Scrambling | MCS |
|---|---|---|
| 0 | 1 layers, port 1, pattern A, 1CW, $n_{SCID} = 0$ | 0 |
| 1 | 1 layers, port 1, pattern A, 1CW, $n_{SCID} = 0$ | 1 |
| 2 | 1 layers, port 1, pattern A, 1CW, $n_{SCID} = 0$ | 2 |
| 3 | 1 layers, port 1, pattern A, 1CW, $n_{SCID} = 0$ | 3 |
| ... | ... | ... |
| 31 | 1 layers, port 1, pattern A, 1CW, $n_{SCID} = 0$ | 31 |
| 32 | 1 layers, port 1, pattern A, 1CW, $n_{SCID} = 1$ | 0 |
| 33 | 1 layers, port 1, pattern A, 1CW, $n_{SCID} = 1$ | 1 |
| 34 | 1 layers, port 1, pattern A, 1CW, $n_{SCID} = 1$ | 2 |
| 35 | 1 layers, port 1, pattern A, 1CW, $n_{SCID} = 1$ | 3 |
| ... | ... | ... |
| 63 | 1 layers, port 1, pattern A, 1CW, $n_{SCID} = 1$ | 31 |

For the same codeword indicating one coding scheme and a plurality of modulation schemes, the indication of the modulation scheme may be indicated in differential manner.

Optionally, for one TB or one data stream, it would be complicated to achieve channel coding for a plurality of data layers using different code rates. Therefore, for a plurality of data layer groups included in one data stream, the base station can notify one coding scheme and a plurality of modulation schemes. That is, the plurality of data layer groups can use the same coding scheme or code rate but different modulation schemes. Since few standard modulation schemes are used, for example, are limited to BPSK, QBPSK, 16QAM, 64QAM, and 256QAM. The common bit rate information and the notification of modulation scheme in a differential manner can save control signaling overhead. For example, one codeword includes two data layer groups, so that the base station uses M bits to notify $MCS_0$ and O bits to notify the deviation of the modulation scheme. Similarly, the absolute deviation value of the modulation scheme may be a non-negative number or a non-integer. The value of the code rate is already included in $MCS_0$. The code rate values of two data layer groups are the same and both are obtained from $MCS_0$.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Eighth Embodiment

The embodiment of the present disclosure provides a signaling indication method that may include: transmitting joint indication information from a first communication node to a second communication node, when the joint indication information includes a DMRS parameter, indication bits having a number of ports less than M include: a first portion indication bit and a second portion indication bit, wherein the first portion indication bit distinguishes different scrambling sequences, the second portion indication bit does not distinguish scrambling sequences. Wherein, the first portion indication bit and the second portion indication bit correspond to different DMRS patterns. Possibly, the number of ports included in the DMRS pattern corresponding to the second portion indication bit is greater than the number of ports included in the DMRS pattern corresponding to the first portion indication bit.

In the embodiment of the present disclosure, the first communication node may be a base station, and the second communication node may be a terminal, i.e., the base station transmits joint indication information to the terminal.

In the embodiment of the present disclosure, the higher layer signaling may be RRC signaling and MAC signaling, or may be a set of RRC signaling and MAC signaling.

In order to meet the requirements of different scenarios and the channel conditions of different user terminals, NR will support a variety of DMRS patterns. For example, for a user terminal with high SINR, the DMRS density of each port may be lower, so that the DMRS overhead may be less, and the remaining REs can be used to transmit data; on the contrary, for a user terminal with low SINR, the DMRS density of each port must be higher to enhance the channel estimation performance. In addition, NR intends to support front loaded DMRS on one or two OFDM symbols within one PRB, and to support the largest number of DMRS ports, such as SU-MIMO 8 ports, and MU-MIMO 12 ports. Therefore, the number of DMRS ports supported by different DMRS patterns may also be different. If the total number of ports (including SU and MU) is small, then the DMRS pattern design on one or two OFDM symbols can increase the density of each port, and if the total number of ports is large, then density of each port of the DMRS cannot be too large.

For example, for the case where the maximum number of ports is 2, DMRS patterns as shown in FIG. 19, FIG. 20 may be adopted. The patterns 9a and 9b correspond to different densities and are suitable for user terminals in different channel conditions; for the case where the maximum number of ports is 4, the DMRS pattern as shown in FIG. 4 may be adopted; for the case where the maximum number of ports is 8, the DMRS pattern as shown in FIG. 14 may be adopted. And for the case where the maximum number of ports is 12, the DMRS pattern as shown in FIG. 10 may be adopted.

Table 5 lists examples of different numbers of layers, port sequence numbers, scrambling sequences, and the like in various DMRS patterns being indicated using different information indication bits.

When the base station performs multi-user terminal scheduling, the channel conditions of a single user terminal generally tend to be direct-path. Therefore, the number of layers of each user terminal is relatively small, and thus multi-user terminal scheduling is performed when the number of ports is less than M. When performing multi-user terminal scheduling, pseudo-orthogonality can be performed among the multiple user terminals. In other words, different scrambling sequences are used to distinguish different user terminals (for example, using different $n_{SCID}$). In Table 5, it is assumed that the maximum number of layers per user terminal is 2, that is, M=3, when performing multi-user terminal scheduling.

However, the number of user terminals in a cell cannot be too large. If a maximum of 12 orthogonal ports are supported, it is not necessary to support pseudo-orthogonality. In this case, $n_{SCID}$ is no longer needed to distinguish the DMRS ports of different user terminals. In order to save control signaling overhead, even if a small number of layers are configured for the user terminal, the DMRS pattern supporting the larger number of orthogonal ports needs not to be pseudo-orthogonal, that is, different indication bits are not needed to distinguish the $n_{SCID}$. It is considered $n_{SCID}=0$ by default. As can be seen from Table 3, the pattern 7a supports a maximum of 12 orthogonal ports. If each user terminal is assigned one layer during multi-user terminal scheduling, a maximum of 12 user terminals are supported for multi-user terminal scheduling. If each user terminal is assigned to 2 layers, a maximum of 6 user terminals are supported for multi-user terminal scheduling. At this time, for the case where the number of layers is less than or equal to 2, it is considered $n_{SCID}$ be 0 by default, thus different scrambling sequences are no longer needed for pseudo-orthogonality. Therefore, the indication bits (value) 52-63, 90-95 in Table 5 can be removed. After these indication bits are removed, the base station and the user terminal can be renumbered by default, and the remaining indication bits are 112−12−6=94.

When the joint indication information includes a DMRS parameter, indication bits having a number of ports less than M include: a first portion indication bit and a second portion indication bit, wherein the first portion indication bit distinguishes different scrambling sequences, the second portion indication bit does not distinguish scrambling sequences. Wherein, the second portion indication bit means that the number of layers is less than or equal to 2, and the corresponding DMRS pattern is the indication bit of the pattern 7a, and the first portion indication bit means that the number of layers is less than or equal to 2, and the DMRS pattern is not the indication bit of the pattern 7a. Apparently, these two portion indication bits correspond to different layers, and the pattern 7a supports a maximum of 12 orthogonal ports, whereas the maximum number of ports supported by other patterns is less than 12. That is to say, the number of orthogonal ports included in the DMRS pattern corresponding to the second portion indication bit is greater than the number of orthogonal ports included in the DMRS pattern corresponding to the first portion indication bit.

TABLE 5

| Value | Message | MCS and/or PTRS and/or Others) |
|---|---|---|
| 0 | 1 layer, pattern 9b, ports 1, | $n_{SCID} = 0$ |
| 1 | 1 layer, pattern 9b, ports 1, | $n_{SCID} = 1$ |
| 2 | 1 layer, pattern 9b, ports 2, | $n_{SCID} = 0$ |
| 3 | 1 layer, pattern 9b, ports 2, | $n_{SCID} = 1$ |
| 4 | 1 layer, pattern 9a, ports 1, | $n_{SCID} = 0$ |
| 5 | 1 layer, pattern 9a, ports 1, | $n_{SCID} = 1$ |
| 6 | 1 layer, pattern 9a, ports 2, | $n_{SCID} = 0$ |
| 7 | 1 layer, pattern 9a, ports 2, | $n_{SCID} = 1$ |
| 8 | 1 layer, pattern 3a, ports 1, | $n_{SCID} = 0$ |
| 9 | 1 layer, pattern 3a, ports 1, | $n_{SCID} = 1$ |
| 10 | 1 layer, pattern 3a, ports 2, | $n_{SCID} = 0$ |
| 11 | 1 layer, pattern 3a, ports 2, | $n_{SCID} = 1$ |
| 12 | 1 layer, pattern 3a, ports 3, | $n_{SCID} = 0$ |
| 13 | 1 layer, pattern 3a, ports 3, | $n_{SCID} = 1$ |
| 14 | 1 layer, pattern 3a, ports 4, | $n_{SCID} = 0$ |
| 15 | 1 layer, pattern 3a, ports 4, | $n_{SCID} = 1$ |
| 16 | 1 layer, pattern 3b, ports 1, | $n_{SCID} = 0$ |
| 17 | 1 layer, pattern 3b, ports 1, | $n_{SCID} = 1$ |
| 18 | 1 layer, pattern 3b, ports 2, | $n_{SCID} = 0$ |
| 19 | 1 layer, pattern 3b, ports 2, | $n_{SCID} = 1$ |
| 20 | 1 layer, pattern 3b, ports 3, | $n_{SCID} = 0$ |
| 21 | 1 layer, pattern 3b, ports 3, | $n_{SCID} = 1$ |
| 22 | 1 layer, pattern 3b, ports 4, | $n_{SCID} = 0$ |
| 23 | 1 layer, pattern 3b, ports 4, | $n_{SCID} = 1$ |
| 24 | 1 layer, pattern 8a, ports 1, | $n_{SCID} = 0$ |
| 25 | 1 layer, pattern 8a, ports 2, | $n_{SCID} = 0$ |
| 26 | 1 layer, pattern 8a, ports 3, | $n_{SCID} = 0$ |
| 27 | 1 layer, pattern 8a, ports 4, | $n_{SCID} = 0$ |
| 28 | 1 layer, pattern 8a, ports 5, | $n_{SCID} = 0$ |
| 29 | 1 layer, pattern 8a, ports 6, | $n_{SCID} = 0$ |

TABLE 5-continued

| Value | Message | MCS and/or PTRS and/or Others) |
|---|---|---|
| 30 | 1 layer, pattern 8a, ports 7, | $n_{SCID} = 0$ |
| 31 | 1 layer, pattern 8a, ports 8, | $n_{SCID} = 0$ |
| 32 | 1 layer, pattern 8a, ports 1, | $n_{SCID} = 1$ |
| 33 | 1 layer, pattern 8a, ports 2, | $n_{SCID} = 1$ |
| 34 | 1 layer, pattern 8a, ports 3, | $n_{SCID} = 1$ |
| 35 | 1 layer, pattern 8a, ports 4, | $n_{SCID} = 1$ |
| 36 | 1 layer, pattern 8a, ports 5, | $n_{SCID} = 1$ |
| 37 | 1 layer, pattern 8a, ports 6, | $n_{SCID} = 1$ |
| 38 | 1 layer, pattern 8a, ports 7, | $n_{SCID} = 1$ |
| 39 | 1 layer, pattern 8a, ports 8, | $n_{SCID} = 1$ |
| 40 | 1 layer, pattern 7a, ports 1, | $n_{SCID} = 0$ |
| 41 | 1 layer, pattern 7a, ports 2, | $n_{SCID} = 0$ |
| 42 | 1 layer, pattern 7a, ports 3, | $n_{SCID} = 0$ |
| 43 | 1 layer, pattern 7a, ports 4, | $n_{SCID} = 0$ |
| 44 | 1 layer, pattern 7a, ports 5, | $n_{SCID} = 0$ |
| 45 | 1 layer, pattern 7a, ports 6, | $n_{SCID} = 0$ |
| 46 | 1 layer, pattern 7a, ports 7, | $n_{SCID} = 0$ |
| 47 | 1 layer, pattern 7a, ports 8, | $n_{SCID} = 0$ |
| 48 | 1 layer, pattern 7a, ports 9, | $n_{SCID} = 0$ |
| 49 | 1 layer, pattern 7a, ports 10, | $n_{SCID} = 0$ |
| 50 | 1 layer, pattern 7a, ports 11, | $n_{SCID} = 0$ |
| 51 | 1 layer, pattern 7a, ports 12, | $n_{SCID} = 0$ |
| 52 | 1 layer, pattern 7a, ports 1, | $n_{SCID} = 1$ |
| 53 | 1 layer, pattern 7a, ports 2, | $n_{SCID} = 1$ |
| 54 | 1 layer, pattern 7a, ports 3, | $n_{SCID} = 1$ |
| 55 | 1 layer, pattern 7a, ports 4, | $n_{SCID} = 1$ |
| 56 | 1 layer, pattern 7a, ports 5, | $n_{SCID} = 1$ |
| 57 | 1 layer, pattern 7a, ports 6, | $n_{SCID} = 1$ |
| 58 | 1 layer, pattern 7a, ports 7, | $n_{SCID} = 1$ |
| 59 | 1 layer, pattern 7a, ports 8, | $n_{SCID} = 1$ |
| 60 | 1 layer, pattern 7a, ports 9, | $n_{SCID} = 1$ |
| 61 | 1 layer, pattern 7a, ports 10, | $n_{SCID} = 1$ |
| 62 | 1 layer, pattern 7a, ports 11, | $n_{SCID} = 1$ |
| 63 | 1 layer, pattern 7a, ports 12, | $n_{SCID} = 1$ |
| 64 | 2 layers, pattern 9b, ports 1, 2 | $n_{SCID} = 0$ |
| 65 | 2 layers, pattern 9b, ports 1, 2 | $n_{SCID} = 1$ |
| 66 | 2 layers, pattern 9a, ports 1, 2 | $n_{SCID} = 0$ |
| 67 | 2 layers, pattern 9a, ports 1, 2 | $n_{SCID} = 1$ |
| 68 | 2 layers, pattern 3a, ports 1, 2 | $n_{SCID} = 0$ |
| 69 | 2 layers, pattern 3a, ports 1, 2 | $n_{SCID} = 1$ |
| 70 | 2 layers, pattern 3a, ports 3, 4 | $n_{SCID} = 0$ |
| 71 | 2 layers, pattern 3a, ports 3, 4 | $n_{SCID} = 1$ |
| 72 | 2 layers, pattern 3b, ports 1, 2 | $n_{SCID} = 0$ |
| 73 | 2 layers, pattern 3b, ports 1, 2 | $n_{SCID} = 1$ |
| 74 | 2 layers, pattern 3b, ports 3, 4 | $n_{SCID} = 0$ |
| 75 | 2 layers, pattern 3b, ports 3, 4 | $n_{SCID} = 1$ |
| 76 | 2 layers, pattern 8a, ports 1, 2 | $n_{SCID} = 0$ |
| 77 | 2 layers, pattern 8a, ports 1, 2 | $n_{SCID} = 1$ |
| 78 | 2 layers, pattern 8a, ports 3, 4 | $n_{SCID} = 0$ |
| 79 | 2 layers, pattern 8a, ports 3, 4 | $n_{SCID} = 1$ |
| 80 | 2 layers, pattern 8a, ports 5, 6 | $n_{SCID} = 0$ |
| 81 | 2 layers, pattern 8a, ports 5, 6 | $n_{SCID} = 1$ |
| 82 | 2 layers, pattern 8a, ports 7, 8 | $n_{SCID} = 0$ |
| 83 | 2 layers, pattern 8a, ports 7, 8 | $n_{SCID} = 1$ |
| 84 | 2 layers, pattern 7a, ports 1, 2 | $n_{SCID} = 0$ |
| 85 | 2 layers, pattern 7a, ports 3, 4 | $n_{SCID} = 0$ |
| 86 | 2 layers, pattern 7a, ports 5, 6 | $n_{SCID} = 0$ |
| 87 | 2 layers, pattern 7a, ports 7, 8 | $n_{SCID} = 0$ |
| 88 | 2 layers, pattern 7a, ports 9, 10 | $n_{SCID} = 0$ |
| 89 | 2 layers, pattern 7a, ports 11, 12 | $n_{SCID} = 0$ |
| 90 | 2 layers, pattern 7a, ports 1, 2 | $n_{SCID} = 1$ |
| 91 | 2 layers, pattern 7a, ports 3, 4 | $n_{SCID} = 1$ |
| 92 | 2 layers, pattern 7a, ports 5, 6 | $n_{SCID} = 1$ |
| 93 | 2 layers, pattern 7a, ports 7, 8 | $n_{SCID} = 1$ |
| 94 | 2 layers, pattern 7a, ports 9, 10 | $n_{SCID} = 1$ |
| 95 | 2 layers, pattern 7a, ports 11, 12 | $n_{SCID} = 1$ |
| 96 | 3 layers, pattern 3a, ports 1, 2, 3 | $n_{SCID} = 0$ |
| 97 | 3 layers, pattern 3b, ports 1, 2, 3 | $n_{SCID} = 0$ |
| 98 | 3 layers, pattern 8a, ports 1, 2, 3 | $n_{SCID} = 0$ |
| 99 | 3 layers, pattern 7a, ports 1, 2, 3 | $n_{SCID} = 0$ |
| 100 | 4 layers, pattern 3a, ports 1, 2, 3, 4 | $n_{SCID} = 0$ |
| 101 | 4 layers, pattern 3b, ports 1, 2, 3, 4 | $n_{SCID} = 0$ |
| 102 | 4 layers, pattern 8a, ports 1, 2, 3, 4 | $n_{SCID} = 0$ |
| 103 | 4 layers, pattern 7a, ports 1, 2, 3, 4 | $n_{SCID} = 0$ |
| 104 | 5 layers, pattern 8a, ports 1, 2, 3, 4, 5 | $n_{SCID} = 0$ |

TABLE 5-continued

| Value | Message | MCS and/or PTRS and/or Others) |
|---|---|---|
| 105 | 5 layers, pattern 7a, ports 1, 2, 3, 4, 5 | $n_{SCID} = 0$ |
| 106 | 6 layers, pattern 8a, ports 1, 2, 3, 4, 5, 6 | $n_{SCID} = 0$ |
| 107 | 6 layers, pattern 7a, ports 1, 2, 3, 4, 5, 6 | $n_{SCID} = 0$ |
| 108 | 7 layers, pattern 8a, ports 1, 2, 3, 4, 5, 6, 7 | $n_{SCID} = 0$ |
| 109 | 7 layers, pattern 7a, ports 1, 2, 3, 4, 5, 6, 7 | $n_{SCID} = 0$ |
| 110 | 8 layers, pattern 8a, ports 1, 2, 3, 4, 5, 6, 7, 8 | $n_{SCID} = 0$ |
| 111 | 8 layers, pattern 7a, ports 1, 2, 3, 4, 5, 6, 7, 8 | $n_{SCID} = 0$ |

In general cell scheduling, whether the DMRS pattern supports 12 orthogonal ports needs to be determined according to the number of user terminals of the cell, the frequency band used, and the like. For example, in low frequency band, up to 12 orthogonal ports can be supported, but in high frequency band only a maximum of 8 orthogonal ports need to be supported. Therefore, a DMRS pattern whether to support 12 orthogonal ports can be configured by the base station to the user terminal through higher layer signaling. If the user terminal does not support the DMRS pattern of 12 orthogonal ports, all the indication bits corresponding to pattern 7a in Table 5 of the above example may be removed, and the remaining indication bits are reordered consecutively, and the dynamic indication overhead needed may be reduced, and at the same time, reception complexity of the user terminal may also be reduced.

Of course, joint indication information jointly indicates DMRS information, and/or MCS information, PTRS information, for example. It does not means that contents which are not listed in Table 5 in detail do not exist.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Ninth Embodiment

The embodiment of the present disclosure provides a signaling indication method that may include: a first communication node configuring one or more subsets of the joint indication information from a predefined set of joint information indication for the second communication node by signaling, wherein different subsets of the joint indication information are configured for different second communication nodes.

As shown in the eighth embodiment, even if the indication bits corresponding to some DMRS patterns and scrambling sequences are restricted, a large number of indication bits are still in need. If jointly indicated in combination with other information such as MCS and PTRS, the base station needs a lot of dynamic signaling to notify the user terminal of the information. In practice, different cells have different conditions. For example, some cells usually have few user terminals, whereas the change of the number of user terminals is semi-static, hence the maximum orthogonal ports supported by the DMRS patterns used by different cells may be different. The base station may configure all supported DMRS patterns to cell #0, but $n_{SCID}$ is 0, and configure the supported DMRS pattern to the neighboring cell #1, but $n_{SCID}$ is 1, so that when performing multi-user terminal scheduling, orthogonal DMRS ports are used between different user terminals in the cells and different pseudo-orthogonal ports are used between the cells. For example, each scheduled user terminal has different conditions. Some user terminals support a maximum of data layers of less than 8, such as 4 or 2, and some user terminals can support a maximum of data layers of 8. The number of transmission layers depends on the minimum values of the number of receiving antennas of the user terminal and the number of antennas of the base station. Therefore, it is not necessary that each user terminal uses the same number of joint information indication bits.

Therefore, the base station may configure different subsets from a predefined set of joint information indication bits to different user terminals. For example, since the user terminal 1 only supports transmission of a maximum of 2-layer data, the information indication bits configured by the base station to the user terminal 1 through RRC signaling include the indication bits {0-94} in Table 3. For example, in the indication bits configured by the base station to the user terminal 1 through RRC signaling, for the case where the number of layers is 1 or 2, only the index with the scrambling sequence ID equal to 1 is included, and all the $n_{SCID}$ in Table 3 accordingly are 0, and no indication bits of less than 3 layers are configured to the user terminal 1, then the final indication information configuration for the user terminal 1 is as shown in Table 6. At this time, without considering information such as MCS, for 64 information indication bits, 6 bits is enough. The predefined set of joint information indication bits includes all possible indication bits. In the embodiment of the present disclosure as shown in Table 5, configured to different user terminals are subsets of predefined information indication bits.

The first communication node configures one or more subsets of joint information indication bits from predefined joint information indication bits to the second communication node in a form of bit map. In order to simplify the design, the selection of the subsets can be implemented in the form of bit map. For example, there are a total of 112 (0-111) indication indexes in Table 5. The base station may use 112 bits RRC signaling to perform indication bit selection, 0 represents none-selection, and 1 represents selection.

Optionally, the base station configures a plurality of subsets to the user terminal through RRC signaling, and then notifies the user terminal which subset it is by using other signaling such as MAC CE signaling or dynamic physical layer control signaling (DCI).

TABLE 6

| Value | Message | MCS and/or PTRS and/or Others |
|---|---|---|
| 0 | 1 layer, pattern 9b, ports 1, | $n_{SCID} = 1$ |
| 1 | 1 layer, pattern 9b, ports 2, | $n_{SCID} = 1$ |
| 2 | 1 layer, pattern 9a, ports 1, | $n_{SCID} = 1$ |
| 3 | 1 layer, pattern 9a, ports 2, | $n_{SCID} = 1$ |
| 4 | 1 layer, pattern 3a, ports 1, | $n_{SCID} = 1$ |
| 5 | 1 layer, pattern 3a, ports 2, | $n_{SCID} = 1$ |
| 6 | 1 layer, pattern 3a, ports 3, | $n_{SCID} = 1$ |
| 7 | 1 layer, pattern 3a, ports 4, | $n_{SCID} = 1$ |
| 8 | 1 layer, pattern 3b, ports 1, | $n_{SCID} = 1$ |

TABLE 6-continued

| Value | Message | MCS and/or PTRS and/or Others |
|---|---|---|
| 9 | 1 layer, pattern 3b, ports 2, | $n_{SCID} = 1$ |
| 10 | 1 layer, pattern 3b, ports 3, | $n_{SCID} = 1$ |
| 11 | 1 layer, pattern 3b, ports 4, | $n_{SCID} = 1$ |
| 12 | 1 layer, pattern 8a, ports 1, | $n_{SCID} = 1$ |
| 13 | 1 layer, pattern 8a, ports 2, | $n_{SCID} = 1$ |
| 14 | 1 layer, pattern 8a, ports 3, | $n_{SCID} = 1$ |
| 15 | 1 layer, pattern 8a, ports 4, | $n_{SCID} = 1$ |
| 16 | 1 layer, pattern 8a, ports 5, | $n_{SCID} = 1$ |
| 17 | 1 layer, pattern 8a, ports 6, | $n_{SCID} = 1$ |
| 18 | 1 layer, pattern 8a, ports 7, | $n_{SCID} = 1$ |
| 19 | 1 layer, pattern 8a, ports 8, | $n_{SCID} = 1$ |
| 20 | 1 layer, pattern 7a, ports 1, | $n_{SCID} = 1$ |
| 21 | 1 layer, pattern 7a, ports 2, | $n_{SCID} = 1$ |
| 22 | 1 layer, pattern 7a, ports 3, | $n_{SCID} = 1$ |
| 23 | 1 layer, pattern 7a, ports 4, | $n_{SCID} = 1$ |
| 24 | 1 layer, pattern 7a, ports 5, | $n_{SCID} = 1$ |
| 25 | 1 layer, pattern 7a, ports 6, | $n_{SCID} = 1$ |
| 26 | 1 layer, pattern 7a, ports 7, | $n_{SCID} = 1$ |
| 27 | 1 layer, pattern 7a, ports 8, | $n_{SCID} = 1$ |
| 28 | 1 layer, pattern 7a, ports 9, | $n_{SCID} = 1$ |
| 29 | 1 layer, pattern 7a, ports 10, | $n_{SCID} = 1$ |
| 30 | 1 layer, pattern 7a, ports 11, | $n_{SCID} = 1$ |
| 31 | 1 layer, pattern 7a, ports 12, | $n_{SCID} = 1$ |
| 32 | 2 layers, pattern 9b, ports 1, 2 | $n_{SCID} = 1$ |
| 33 | 2 layers, pattern 9a, ports 1, 2 | $n_{SCID} = 1$ |
| 34 | 2 layers, pattern 3a, ports 1, 2 | $n_{SCID} = 1$ |
| 35 | 2 layers, pattern 3a, ports 3, 4 | $n_{SCID} = 1$ |
| 36 | 2 layers, pattern 3b, ports 1, 2 | $n_{SCID} = 1$ |
| 37 | 2 layers, pattern 3b, ports 3, 4 | $n_{SCID} = 1$ |
| 38 | 2 layers, pattern 8a, ports 1, 2 | $n_{SCID} = 1$ |
| 39 | 2 layers, pattern 8a, ports 3, 4 | $n_{SCID} = 1$ |
| 40 | 2 layers, pattern 8a, ports 5, 6 | $n_{SCID} = 1$ |
| 41 | 2 layers, pattern 8a, ports 7, 8 | $n_{SCID} = 1$ |
| 42 | 2 layers, pattern 7a, ports 1, 2 | $n_{SCID} = 1$ |
| 43 | 2 layers, pattern 7a, ports 3, 4 | $n_{SCID} = 1$ |
| 44 | 2 layers, pattern 7a, ports 5, 6 | $n_{SCID} = 1$ |
| 45 | 2 layers, pattern 7a, ports 7, 8 | $n_{SCID} = 1$ |
| 46 | 2 layers, pattern 7a, ports 9, 10 | $n_{SCID} = 1$ |
| 47 | 2 layers, pattern 7a, ports 11, 12 | $n_{SCID} = 0$ |
| 48 | 3 layers, pattern 3a, ports 1, 2, 3 | $n_{SCID} = 0$ |
| 49 | 3 layers, pattern 3b, ports 1, 2, 3 | $n_{SCID} = 0$ |
| 50 | 3 layers, pattern 8a, ports 1, 2, 3 | $n_{SCID} = 0$ |
| 51 | 3 layers, pattern 7a, ports 1, 2, 3 | $n_{SCID} = 0$ |
| 52 | 4 layers, pattern 3a, ports 1, 2, 3, 4 | $n_{SCID} = 0$ |
| 53 | 4 layers, pattern 3b, ports 1, 2, 3, 4 | $n_{SCID} = 0$ |
| 54 | 4 layers, pattern 8a, ports 1, 2, 3, 4 | $n_{SCID} = 0$ |
| 55 | 4 layers, pattern 7a, ports 1, 2, 3, 4 | $n_{SCID} = 0$ |
| 56 | 5 layers, pattern 8a, ports 1, 2, 3, 4, 5 | $n_{SCID} = 0$ |
| 57 | 5 layers, pattern 7a, ports 1, 2, 3, 4, 5 | $n_{SCID} = 0$ |
| 58 | 6 layers, pattern 8a, ports 1, 2, 3, 4, 5, 6 | $n_{SCID} = 0$ |
| 59 | 6 layers, pattern 7a, ports 1, 2, 3, 4, 5, 6 | $n_{SCID} = 0$ |
| 60 | 7 layers, pattern 8a, ports 1, 2, 3, 4, 5, 6, 7 | $n_{SCID} = 0$ |
| 61 | 7 layers, pattern 7a, ports 1, 2, 3, 4, 5, 6, 7 | $n_{SCID} = 0$ |
| 62 | 8 layers, pattern 8a, ports 1, 2, 3, 4, 5, 6, 7, 8 | $n_{SCID} = 0$ |
| 63 | 8 layers, pattern 7a, ports 1, 2, 3, 4, 5, 6, 7, 8 | $n_{SCID} = 0$ |

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Tenth Embodiment

The embodiment of the present disclosure provides a signaling indication method that may include: configuring one or more sets of joint information indication bits for the second communication node through higher layer signaling, wherein different sets of joint information indication bits are configured for different second communication nodes.

In the embodiment of the present disclosure, the first communication node may be a base station, and the second communication node may be a terminal, i.e., the base station transmits joint indication information to the terminal.

In the embodiment of the present disclosure, the higher layer signaling may be RRC signaling and MAC signaling, or may be a set of RRC signaling and MAC signaling.

At this time, a predefined set of total joint indication information indication bits is no longer needed, but a plurality of sets of joint information indication bits are directly predefined, and then the base station configures one or more predefined sets to the user terminal through higher layer signaling. For example, the system pre-defines N sets of joint information indication bits, and the base station configures different sets for different user terminals through higher layer RRC signaling, and the number of indication bits included in different sets may be different.

For example, the system pre-defines four sets, and set #1 corresponds to the indication bits of patterns 9a, 9b, as shown in Table 7. Similarly, set #2 corresponds to the indication bits of patterns 3a, 3b, as shown in Table 8; similarly, set #3 corresponds to the indication bits of pattern 8a, and set #4 corresponds to the indication bits of pattern 7a. The base station may configure the user terminal with the predefined set(s) of joint information indication bits through higher layer signaling.

If the base station configures a plurality of sets of joint information indication bits for the user terminal, the base station may use MAC CE signaling or physical layer dynamic signaling to notify the user terminal which set it is.

Optionally, if the first communication node configures a plurality of sets of joint indication information for the second communication node, the plurality of sets of joint indication information configured for the second communication node are combined into one set, indexes of information indication bits of the combined set are rearranged in an ascending order.

Optionally, if the base station configures a plurality of sets of indication bits of the joint indication information for the user terminal, the configured plurality of sets are combined into one set, indexes of information indication bits being rearranged in an ascending order. For example, if the base station configures set #1, set #2 for the user terminal through RRC signaling, then the combined set includes all information indication bits of the set #1, set #2, and the indexes are reordered, as shown in Table 9.

TABLE 7

| Value | Value | MCS and/or PTRS and/or Others |
|---|---|---|
| 0 | 1 layer, pattern 9b, ports 1, | $n_{SCID} = 0$ |
| 1 | 1 layer, pattern 9b, ports 1, | $n_{SCID} = 1$ |
| 2 | 1 layer, pattern 9b, ports 2, | $n_{SCID} = 0$ |
| 3 | 1 layer, pattern 9b, ports 2, | $n_{SCID} = 1$ |
| 4 | 1 layer, pattern 9a, ports 1, | $n_{SCID} = 0$ |
| 5 | 1 layer, pattern 9a, ports 1, | $n_{SCID} = 1$ |

TABLE 7-continued

| Value | Value | MCS and/or PTRS and/or Others |
|---|---|---|
| 6 | 1 layer, pattern 9a, ports 2, | $n_{SCID} = 0$ |
| 7 | 1 layer, pattern 9a, ports 2, | $n_{SCID} = 1$ |
| 8 | 2 layers, pattern 9b, ports 1, 2 | $n_{SCID} = 0$ |
| 9 | 2 layers, pattern 9b, ports 1, 2 | $n_{SCID} = 1$ |
| 10 | 2 layers, pattern 9a, ports 1, 2 | $n_{SCID} = 0$ |
| 11 | 2 layers, pattern 9a, ports 1, 2 | $n_{SCID} = 1$ |

TABLE 8

| Value | Value | MCS and/or PTRS and/or Others |
|---|---|---|
| 0 | 1 layer, pattern 3a, ports 1, | $n_{SCID} = 0$ |
| 1 | 1 layer, pattern 3a, ports 1, | $n_{SCID} = 1$ |
| 2 | 1 layer, pattern 3a, ports 2, | $n_{SCID} = 0$ |
| 3 | 1 layer, pattern 3a, ports 2, | $n_{SCID} = 1$ |
| 4 | 1 layer, pattern 3a, ports 3, | $n_{SCID} = 0$ |
| 5 | 1 layer, pattern 3a, ports 3, | $n_{SCID} = 1$ |
| 6 | 1 layer, pattern 3a, ports 4, | $n_{SCID} = 0$ |
| 7 | 1 layer, pattern 3a, ports 4, | $n_{SCID} = 1$ |
| 8 | 1 layer, pattern 3b, ports 1, | $n_{SCID} = 0$ |
| 9 | 1 layer, pattern 3b, ports 1, | $n_{SCID} = 1$ |
| 10 | 1 layer, pattern 3b, ports 2, | $n_{SCID} = 0$ |
| 11 | 1 layer, pattern 3b, ports 2, | $n_{SCID} = 1$ |
| 12 | 1 layer, pattern 3b, ports 3, | $n_{SCID} = 0$ |
| 13 | 1 layer, pattern 3b, ports 3, | $n_{SCID} = 1$ |
| 14 | 1 layer, pattern 3b, ports 4, | $n_{SCID} = 0$ |
| 15 | 1 layer, pattern 3b, ports 4, | $n_{SCID} = 1$ |
| 16 | 2 layers, pattern 3a, ports 1, 2 | $n_{SCID} = 0$ |
| 17 | 2 layers, pattern 3a, ports 1, 2 | $n_{SCID} = 1$ |
| 18 | 2 layers, pattern 3a, ports 3, 4 | $n_{SCID} = 0$ |
| 19 | 2 layers, pattern 3a, ports 3, 4 | $n_{SCID} = 1$ |
| 20 | 2 layers, pattern 3b, ports 1, 2 | $n_{SCID} = 0$ |
| 21 | 2 layers, pattern 3b, ports 1, 2 | $n_{SCID} = 1$ |
| 22 | 2 layers, pattern 3b, ports 3, 4 | $n_{SCID} = 0$ |
| 23 | 2 layers, pattern 3b, ports 3, 4 | $n_{SCID} = 1$ |
| 24 | 3 layers, pattern 3a, ports 1, 2, 3 | $n_{SCID} = 0$ |
| 25 | 3 layers, pattern 3b, ports 1, 2, 3 | $n_{SCID} = 0$ |
| 26 | 4 layers, pattern 3a, ports 1, 2, 3, 4 | $n_{SCID} = 0$ |
| 27 | 4 layers, pattern 3b, ports 1, 2, 3, 4 | $n_{SCID} = 0$ |

TABLE 9

| Value | Value | MCS and/or PTRS and/or Others |
|---|---|---|
| 0 | 1 layer, pattern 9b, ports 1, | $n_{SCID} = 0$ |
| 1 | 1 layer, pattern 9b, ports 1, | $n_{SCID} = 1$ |
| 2 | 1 layer, pattern 9b, ports 2, | $n_{SCID} = 0$ |
| 3 | 1 layer, pattern 9b, ports 2, | $n_{SCID} = 1$ |
| 4 | 1 layer, pattern 9a, ports 1, | $n_{SCID} = 0$ |
| 5 | 1 layer, pattern 9a, ports 1, | $n_{SCID} = 1$ |
| 6 | 1 layer, pattern 9a, ports 2, | $n_{SCID} = 0$ |
| 7 | 1 layer, pattern 9a, ports 2, | $n_{SCID} = 1$ |
| 8 | 2 layers, pattern 9b, ports 1, 2 | $n_{SCID} = 0$ |
| 9 | 2 layers, pattern 9b, ports 1, 2 | $n_{SCID} = 1$ |
| 10 | 2 layers, pattern 9a, ports 1, 2 | $n_{SCID} = 0$ |
| 11 | 2 layers, pattern 9a, ports 1, 2 | $n_{SCID} = 1$ |
| 12 | 1 layer, pattern 3a, ports 1, | $n_{SCID} = 0$ |
| 13 | 1 layer, pattern 3a, ports 1, | $n_{SCID} = 1$ |
| 14 | 1 layer, pattern 3a, ports 2, | $n_{SCID} = 0$ |
| 15 | 1 layer, pattern 3a, ports 2, | $n_{SCID} = 1$ |
| 16 | 1 layer, pattern 3a, ports 3, | $n_{SCID} = 0$ |
| 17 | 1 layer, pattern 3a, ports 3, | $n_{SCID} = 1$ |
| 18 | 1 layer, pattern 3a, ports 4, | $n_{SCID} = 0$ |
| 19 | 1 layer, pattern 3a, ports 4, | $n_{SCID} = 1$ |
| 20 | 1 layer, pattern 3b, ports 1, | $n_{SCID} = 0$ |
| 21 | 1 layer, pattern 3b, ports 1, | $n_{SCID} = 1$ |
| 22 | 1 layer, pattern 3b, ports 2, | $n_{SCID} = 0$ |
| 23 | 1 layer, pattern 3b, ports 2, | $n_{SCID} = 1$ |
| 24 | 1 layer, pattern 3b, ports 3, | $n_{SCID} = 0$ |
| 25 | 1 layer, pattern 3b, ports 3, | $n_{SCID} = 1$ |
| 26 | 1 layer, pattern 3b, ports 4, | $n_{SCID} = 0$ |
| 27 | 1 layer, pattern 3b, ports 4, | $n_{SCID} = 1$ |
| 28 | 2 layers, pattern 3a, ports 1, 2 | $n_{SCID} = 0$ |
| 29 | 2 layers, pattern 3a, ports 1, 2 | $n_{SCID} = 1$ |
| 30 | 2 layers, pattern 3a, ports 3, 4 | $n_{SCID} = 0$ |
| 31 | 2 layers, pattern 3a, ports 3, 4 | $n_{SCID} = 1$ |
| 32 | 2 layers, pattern 3b, ports 1, 2 | $n_{SCID} = 0$ |
| 33 | 2 layers, pattern 3b, ports 1, 2 | $n_{SCID} = 1$ |
| 34 | 2 layers, pattern 3b, ports 3, 4 | $n_{SCID} = 0$ |
| 35 | 2 layers, pattern 3b, ports 3, 4 | $n_{SCID} = 1$ |
| 36 | 3 layers, pattern 3a, ports 1, 2, 3 | $n_{SCID} = 0$ |
| 37 | 3 layers, pattern 3b, ports 1, 2, 3 | $n_{SCID} = 0$ |
| 38 | 4 layers, pattern 3a, ports 1, 2, 3, 4 | $n_{SCID} = 0$ |
| 39 | 4 layers, pattern 3b, ports 1, 2, 3, 4 | $n_{SCID} = 0$ |

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Eleventh Embodiment

The embodiment of the present disclosure provides a signaling indication method. As shown in FIG. 1, the method may include: a second communication node receiving joint indication information transmitted from a first communication node, the joint indication information including DMRS information, the joint indication information further including at least one of: data modulation scheme, data coding scheme, transmission resource allocation, retransmission RV, PTRS, hybrid automatic repeat request (HARQ) process, slot structure and data indication information.

Herein, the data indication information includes: indication information to retransmit data or new data indication information.

The DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

In the embodiment of the present disclosure, the first communication node may be a base station, and the second communication node may be a terminal, i.e., the base station transmits joint indication information to the terminal.

Optionally, the signaling indication method according to the embodiment of the present disclosure is a method on the second communication node side corresponding to the method on the first communication node side of the first embodiment. Therefore, the understanding of this embodiment can be referred to the description of the first embodiment, and the description thereof will be omitted here.

The signaling indication method according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Twelfth Embodiment

Figure 22:
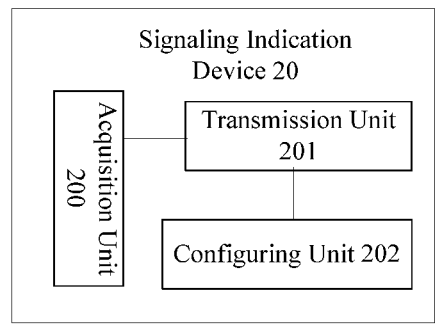
FIG. 22 is a schematic diagram of a structure of a signaling indication device according to an embodiment of the present disclosure.

The embodiment of the present disclosure provides a signaling indication device 20, as shown in FIG. 22, including: an acquisition unit 200, a transmission unit 201, wherein the acquisition unit 200 is configured to acquire joint indication information; and the transmission unit 201 is configured to transmit joint indication information to a second communication node, wherein the joint indication information is used for joint indication.

Optionally, the joint indication information includes DMRS information, the joint indication information further includes at least one of: data modulation scheme, data coding scheme, transmission resource allocation, retransmission RV, PTRS, HARQ process, time unit structure and data indication information.

Optionally, the DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

Optionally, the DMRS information and PTRS configuration information are jointly indicated; wherein the DMRS information refers to whether a plurality of ports uses CDM on a plurality of time domain symbols, wherein the multiplexing scheme includes TDM or CDM.

Optionally, the PTRS configuration information includes information indicating presence of higher layer configured PTRS; or the PTRS configuration information includes information indicating presence of higher layer configured PTRS, an indication value of a digital modulation and coding scheme, and a threshold value of the data modulation and coding scheme.

Optionally, the DMRS information is jointly indicated together with data modulation scheme configuration information, data coding scheme configuration information or data modulation and coding scheme configuration information;

wherein the DMRS information includes at least one of: a number of DMRS time domain symbols and information on whether DMRS and data are simultaneously transmitted;

the data modulation scheme configuration information includes at least one of: a dynamic data modulation scheme and a data modulation scheme threshold;

the data coding scheme configuration information includes at least one of: a dynamic data coding scheme and a data coding scheme threshold; and the data modulation and coding scheme configuration information includes at least one of: a dynamic data modulation and coding scheme and a data modulation and coding scheme threshold.

Optionally, different data modulation schemes correspond to densities of different DMRS ports;

different data coding schemes correspond to densities of different DMRS ports; and different data modulation and coding schemes correspond to densities of different DMRS ports.

Optionally, the DMRS pattern and the time unit structure are jointly indicated.

Optionally, when the DMRS pattern includes positions of time domains of the first subset and second subset of the DMRS, a spacing of DMRS subsets corresponding to a short time unit is smaller than a spacing of DMRS subsets corresponding to a long time unit.

Optionally, the DMRS pattern includes at least one of: a number of DMRS time domain symbols and a maximum number of orthogonal DMRS ports that the DMRS pattern supports.

Optionally, the time unit structure refers to a total number of symbols included in the time unit, a guard period and a number of uplink transmission symbols.

Optionally, when the DMRS pattern includes a plurality of subsets, and the time unit structure is different, the position of time domain of the last subset of the DMRS is different.

Optionally, in one or more DMRS patterns, the seventh and tenth DMRS ports are mapped to the same resource position, the eighth and eleventh DMRS ports are mapped to the same resource position, and the ninth and twelfth DMRS ports are mapped to the same resource position;

wherein the one or more DMRS patterns support DMRS of a maximum of 12 ports on two consecutive OFDM symbols.

Optionally, in a transmission period of adjacent frequency domains, mapping of the DMRS ports is swapped on two adjacent OFDM symbols.

Optionally, in a physical transmission resource of adjacent frequency domains, mapping of the DMRS ports is swapped on two adjacent OFDM symbols.

Optionally, the transmission unit 201 is further used to notify a total number of resource particle pairs or a number of resource particle groups of the DMRS in a frequency domain transmission period, wherein a resource particle pair refers to a combination of two adjacent resource particles in a frequency domain, a resource particle group refers to a combination of two resource particle pairs in adjacent time domains.

Optionally, when the joint indication information includes data modulation scheme, a plurality of data modulation schemes corresponding to the same codeword are indicated in a differential manner;

when the joint indication information includes data coding scheme, a plurality of data coding schemes corresponding to the same codeword are indicated in a differential manner;

when the joint indication information includes data modulation and coding scheme, a plurality of data modulation and coding schemes corresponding to the same codeword are indicated in a differential manner.

Optionally, when the same codeword corresponds to a coding scheme, a modulation scheme corresponding to a plurality of transmission layers is indicated in a differential manner.

Optionally, indication bits having a number of DMRS ports less than M include: a first portion indication bit and a second portion indication bit, wherein the first portion indication bit distinguishes different scrambling sequences, the second portion indication bit does not distinguish scrambling sequences, M being a natural number.

Optionally, the first portion indication bit and the second portion indication bit correspond to different DMRS patterns.

Optionally, a number of ports included in the DMRS pattern corresponding to the second portion indication bit is greater than a number of ports included in the DMRS pattern corresponding to the first portion indication bit.

Optionally, the device further includes: a configuring unit 202 configuring one or more subsets from a predefined set of joint information indication for the second communication node by signaling, wherein different subsets of joint indication information are configured for different second communication nodes.

Optionally, the configuring unit 202 is further used to configure one or more subsets from predefined joint indication information for the second communication node in the form of bit map by signaling.

The configuring unit 202 is used to configure one or more sets of joint information indication bits for the second communication node through higher layer signaling, wherein different sets of joint information indication bits are configured for different second communication nodes.

Optionally, if the first communication node configures a plurality of sets of joint indication information for the second communication node, the plurality of sets of joint indication information configured for the second communication node are combined into one set, indexes of information indication bits of the combined set are rearranged in an ascending order.

Optionally, the understanding of the signaling indication device provided in the embodiment of the present disclosure may refer to the description of embodiments of the signaling indication method presented above, and the description thereof will be omitted here.

The signaling indication device according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Thirteenth Embodiment

Figure 23:
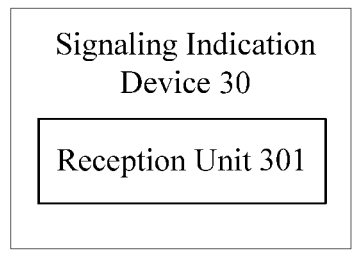
FIG. 23 is a schematic diagram of a structure of a signaling indication device according to an embodiment of the present disclosure.

The embodiment of the present disclosure provides a signaling indication device 30, as shown in FIG. 23, including: a reception unit 301 configured to receive joint indication information transmitted from a first communication node, wherein the joint indication information is used for joint indication.

Optionally, the joint indication information includes DMRS information, the joint indication information further includes at least one of: data modulation scheme, data coding scheme, transmission resource allocation, retransmission RV, PTRS, HARQ process, time unit structure and data indication information.

Optionally, the DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

Optionally, the DMRS information and PTRS configuration information are jointly indicated;

wherein the DMRS information refers to whether a plurality of ports uses CDM on a plurality of time domain symbols, the multiplexing scheme including TDM or CDM.

Optionally, the PTRS configuration information includes information indicating presence of higher layer configured PTRS; or the PTRS configuration information includes information indicating presence of higher layer configured PTRS, an indication value of a digital modulation and coding scheme, and a threshold value of the data modulation and coding scheme.

Optionally, the DMRS information is jointly indicated together with data modulation scheme configuration information, data coding scheme configuration information or data modulation and coding scheme configuration information;

wherein the DMRS information includes at least one of: a number of DMRS time domain symbols and information on whether DMRS and data are simultaneously transmitted;

the data modulation scheme configuration information includes at least one of: a dynamic data modulation scheme and a data modulation scheme threshold;

the data coding scheme configuration information includes at least one of: a dynamic data coding scheme and a data coding scheme threshold; and the data coding scheme configuration information includes at least one of: a dynamic data modulation and coding scheme and a data modulation and coding scheme threshold.

Optionally, different data modulation schemes correspond to densities of different DMRS ports;

different data coding schemes correspond to densities of different DMRS ports; and different data modulation and coding schemes correspond to densities of different DMRS ports.

Optionally, the DMRS pattern and the time unit structure are jointly indicated.

Optionally, when the DMRS pattern include positions of time domains of the first subset and second subset of the DMRS, a spacing of DMRS subsets corresponding to a short time unit is smaller than a spacing of DMRS subsets corresponding to a long time unit.

Optionally, the DMRS pattern includes at least one of: a number of DMRS time domain symbols and a maximum number of orthogonal DMRS ports that the DMRS pattern supports.

Optionally, the time unit structure refers to a total number of symbols included in the time unit, a guard period and a number of uplink transmission symbols.

Optionally, when the DMRS pattern includes a plurality of subsets, and the time unit structure is different, the position of time domain of the last subset of the DMRS is different.

Optionally, in one or more DMRS patterns, the seventh and tenth DMRS ports are mapped to the same resource position, the eighth and eleventh DMRS ports are mapped to the same resource position, and the ninth and twelfth DMRS ports are mapped to the same resource position;

wherein the one or more DMRS patterns support DMRS of a maximum of 12 ports on two consecutive OFDM symbols.

Optionally, in a transmission period of adjacent frequency domains, mapping of the DMRS ports is swapped on two adjacent OFDM symbols.

Optionally, in physical transmission resources of adjacent frequency domains, mapping of the DMRS ports is swapped on two adjacent OFDM symbols.

Optionally, when the joint indication information includes data modulation scheme, a plurality of data modulation schemes corresponding to the same codeword are indicated in a differential manner;

when the joint indication information includes data coding scheme, a plurality of data coding schemes corresponding to the same codeword are indicated in a differential manner;

when the joint indication information includes data modulation and coding scheme, a plurality of data modulation and coding schemes corresponding to the same codeword are indicated in a differential manner.

Optionally, when the same codeword corresponds to a coding scheme, a modulation scheme corresponding to a plurality of transmission layers is indicated in a differential manner.

Optionally, indication bits having a number of DMRS ports less than M include: a first portion indication bit and a second portion indication bit, wherein the first portion indication bit distinguishes different scrambling sequences, the second portion indication bit does not distinguish scrambling sequences, M being a natural number.

Optionally, the first portion indication bit and the second portion indication bit correspond to different DMRS patterns.

Optionally, a number of ports included in the DMRS pattern corresponding to the second portion indication bit is greater than a number of ports included in the DMRS pattern corresponding to the first portion indication bit.

Optionally, the reception unit 301 is used to receive one or more subsets configured by the first communication node from a predefined set of joint information indication by signaling, wherein different subsets of joint indication information are configured for different second communication nodes.

Optionally, the reception unit 301 is used to receive one or more subsets configured by the first communication node from predefined joint indication information in a form of bit map.

Optionally, the reception unit 301 is used to receive one or more sets of joint information indication bits configured by the first communication node by higher layer signaling, wherein different sets of joint information indication bits are configured for different second communication nodes.

Optionally, if a first communication node configures a plurality of sets of joint indication information for the second communication node, the plurality of sets of joint indication information configured for the second communication node are combined into one set, indexes of information indication bits of the combined set are rearranged in an ascending order.

Optionally, the understanding of the signaling indication device provided in the embodiment of the present disclosure may refer to the description of embodiments of the signaling indication method presented above, and the description thereof will be omitted here.

The signaling indication device according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Fourteenth Embodiment

Figure 24:
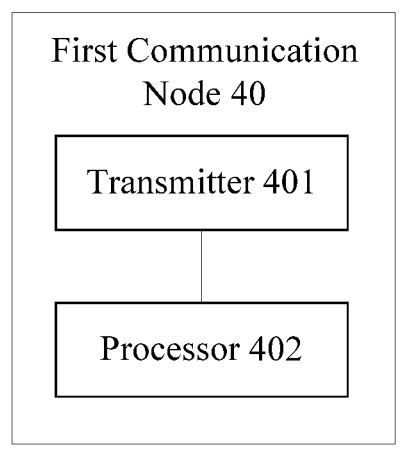
FIG. 24 is a schematic diagram of a structure of a first communication node according to an embodiment of the present disclosure.

The embodiment of the present disclosure provides a first communication node 40, as shown in FIG. 24, including: a transmitter 401, a processor 402, wherein the processor 402 is configured to acquire joint indication information;

the transmitter 401 is configured to transmit the joint indication information to a second communication node, wherein the joint indication information is used for joint indication.

Optionally, the joint indication information includes DMRS information, and the joint indication information further includes at least one of: data modulation scheme, data coding scheme, transmission resource allocation, retransmission RV, PTRS, HARQ process, time unit structure and data indication information.

Optionally, the DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

Optionally, the DMRS information and PTRS configuration information are jointly indicated; wherein the DMRS information refers to whether a plurality of ports uses CDM on a plurality of time domain symbols, the multiplexing scheme including TDM or CDM.

Optionally, the PTRS configuration information includes information indicating presence of higher layer configured PTRS; or the PTRS configuration information includes information indicating presence of higher layer configured PTRS, an indication value of a digital modulation and coding scheme, and a threshold value of the data modulation and coding scheme.

Optionally, the DMRS information is jointly indicated together with data modulation scheme configuration information, data coding scheme configuration information or data modulation and coding scheme configuration information;

wherein the DMRS information includes at least one of: a number of DMRS time domain symbols and information on whether DMRS and data are simultaneously transmitted;

the data modulation scheme configuration information includes at least one of: a dynamic data modulation scheme and a data modulation scheme threshold;

the data coding scheme configuration information includes at least one of: a dynamic data coding scheme and a data coding scheme threshold; and the data modulation and coding scheme configuration information includes at least one of: a dynamic data modulation and coding scheme and a data modulation and coding scheme threshold.

Optionally, different data modulation schemes correspond to densities of different DMRS ports;

different data coding schemes correspond to densities of different DMRS ports; and different data modulation and coding schemes correspond to densities of different DMRS ports.

Optionally, the DMRS pattern and the time unit structure are jointly indicated.

Optionally, when the DMRS pattern includes positions of time domains of the first subset and second subset of the DMRS, a spacing of DMRS subsets corresponding to a short time unit is smaller than a spacing of DMRS subsets corresponding to a long time unit.

Optionally, the DMRS pattern includes at least one of: a number of DMRS time domain symbols and a maximum number of orthogonal DMRS ports that the DMRS pattern supports.

Optionally, the time unit structure refers to a total number of symbols included in the time unit, a guard period and a number of uplink transmission symbols.

Optionally, when the DMRS pattern includes a plurality of subsets, and the time unit structure is different, the position of time domain of the last subset of the DMRS is different.

Optionally, in one or more DMRS patterns, the seventh and tenth DMRS ports are mapped to the same resource position, the eighth and eleventh DMRS ports are mapped to the same resource position, and the ninth and twelfth DMRS ports are mapped to the same resource position;

wherein the one or more DMRS patterns supports a DMRS of a maximum of 12 ports on two consecutive OFDM symbols.

Optionally, in a transmission period of adjacent frequency domains, mapping of the DMRS ports is swapped on two adjacent OFDM symbols.

Optionally, in physical transmission resources of adjacent frequency domains, mapping of the DMRS ports is swapped on two adjacent OFDM symbols.

Optionally, the transmitter 401 is further used for notifying a total number of resource particle pairs or a number of resource particle groups of the DMRS in a frequency domain transmission period, wherein a resource particle pair refers to a combination of two adjacent resource particles in a frequency domain, a resource particle group refers to a combination of two resource particle pairs in adjacent time domains.

Optionally, when the joint indication information includes data modulation scheme, a plurality of data modulation schemes corresponding to the same codeword are indicated in a differential manner;

when the joint indication information includes data coding scheme, a plurality of data coding schemes corresponding to the same codeword are indicated in a differential manner; and when the joint indication information includes data modulation and coding scheme, a plurality of data modulation and coding schemes corresponding to the same codeword are indicated in a differential manner.

Optionally, when the same codeword corresponds to a coding scheme, a modulation scheme corresponding to a plurality of transmission layers is indicated in a differential manner.

Optionally, indication bits having a number of DMRS ports less than M include: a first portion indication bit and a second portion indication bit, wherein the first portion indication bit distinguishes different scrambling sequences, the second portion indication bit does not distinguish scrambling sequences, M being a natural number.

Optionally, the first portion indication bit and the second portion indication bit correspond to different DMRS patterns.

Optionally, a number of ports included in the DMRS pattern corresponding to the second portion indication bit is greater than a number of ports included in the DMRS pattern corresponding to the first portion indication bit.

Optionally, as shown in FIG. 24, the first communication node further includes: a processor 402 for configuring one or more subsets from a predefined set of joint indication information for the second communication node by signaling, wherein different subsets of joint indication information are configured for different second communication nodes.

Optionally, the processor 402 is further used to configure one or more subsets of joint indication information from predefined joint indication information for the second communication node in a form of bit map.

The processor 402 is used to configure one or more sets of joint information indication bits for the second communication node through higher layer signaling, wherein different sets of joint information indication bits are configured for different second communication nodes.

Optionally, if a first communication node configures a plurality of sets of joint indication information for the second communication node, the plurality of sets of joint indication information configured for the second communication node are combined into one set, indexes of information indication bits of the combined set are rearranged in an ascending order.

Optionally, the understanding of the first communication node according to the embodiment of the present disclosure may refer to the description of embodiments of the signaling indication method presented above, and the description thereof will be omitted here.

The first communication node according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

Fifteenth Embodiment

Figure 25:
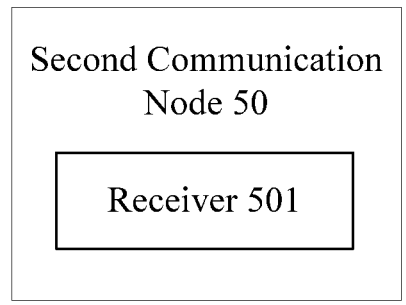
FIG. 25 is a schematic diagram of a structure of a second communication node according to an embodiment of the present disclosure.

The embodiment of the present disclosure provides a second communication node 50, as shown in FIG. 25, including: a receiver 501 for receiving joint indication information transmitted from a first communication node, wherein the joint indication information is used for joint indication.

Optionally, the joint indication information includes DMRS information, and the joint indication information further includes at least one of: data modulation scheme, data coding scheme, transmission resource allocation, retransmission RV, PTRS, HARQ process, time unit structure and data indication information.

Optionally, the DMRS information includes at least one of: a sequence number of a DMRS port, a number of layers of data transmission and a DMRS pattern;

wherein the DMRS pattern includes at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS.

Optionally, the DMRS information and PTRS configuration information are jointly indicated;

wherein the DMRS information refers to whether a plurality of ports uses CDM on a plurality of time domain symbols, wherein the multiplexing scheme includes TDM or CDM.

Optionally, the PTRS configuration information includes information indicating presence of higher layer configured PTRS; or the PTRS configuration information includes information indicating presence of higher layer configured PTRS, an indication value of a digital modulation and coding scheme, and a threshold value of the data modulation and coding scheme.

Optionally, the DMRS information is jointly indicated together with data modulation scheme configuration information, data coding scheme configuration information or data modulation and coding scheme configuration information;

wherein the DMRS information includes at least one of: a number of DMRS time domain symbols and information on whether DMRS and data are simultaneously transmitted;

data modulation scheme configuration information includes at least one of: a dynamic data modulation scheme and a data modulation scheme threshold;

the data coding scheme configuration information includes at least one of: a dynamic data coding scheme and a data coding scheme threshold; and the data modulation and coding scheme configuration information includes at least one of: a dynamic data modulation and coding scheme and a data modulation and coding scheme threshold.

Optionally, different data modulation schemes correspond to densities of different DMRS ports;

different data coding schemes correspond to densities of different DMRS ports; and different data modulation and coding schemes correspond to densities of different DMRS ports.

Optionally, the DMRS pattern and the time unit structure are jointly indicated.

Optionally, when the DMRS pattern includes positions of time domains of the first subset and second subset of the DMRS, a spacing of DMRS subsets corresponding to a short time unit is smaller than a spacing of DMRS subsets corresponding to a long time unit.

Optionally, the DMRS pattern includes at least one of: a number of DMRS time domain symbols and a maximum number of orthogonal DMRS ports that the DMRS pattern supports.

Optionally, the time unit structure refers to a total number of symbols included in the time unit, a guard period and a number of uplink transmission symbols.

Optionally, when the DMRS pattern includes a plurality of subsets, and the time unit structure is different, the position of time domain of the last subset of the DMRS is different.

Optionally, in one or more DMRS patterns, the seventh and tenth DMRS ports are mapped to the same resource position, the eighth and eleventh DMRS ports are mapped to the same resource position, and the ninth and twelfth DMRS ports are mapped to the same resource position;

wherein the one or more DMRS patterns support DMRS of a maximum of 12 ports on two consecutive OFDM symbols.

Optionally, in a transmission period of adjacent frequency domains, mapping of the DMRS ports is swapped on two adjacent OFDM symbols.

Optionally, in physical transmission resources of adjacent frequency domains, mapping of the DMRS ports is swapped on two adjacent OFDM symbols.

Optionally, when the joint indication information includes data modulation scheme, a plurality of data modulation schemes corresponding to the same codeword are indicated in a differential manner;

when the joint indication information includes data coding scheme, a plurality of data coding schemes corresponding to the same codeword are indicated in a differential manner; and when the joint indication information includes data modulation and coding scheme, a plurality of data modulation and coding schemes corresponding to the same codeword are indicated in a differential manner.

Optionally, when the same codeword corresponds to a coding scheme, a modulation scheme corresponding to a plurality of transmission layers is indicated in a differential manner.

Optionally, indication bits having a number of DMRS ports less than M include: a first portion indication bit and a second portion indication bit, wherein the first portion indication bit distinguishes different scrambling sequences, the second portion indication bit does not distinguish scrambling sequences, M being a natural number.

Optionally, the first portion indication bit and the second portion indication bit correspond to different DMRS patterns.

Optionally, a number of ports included in the DMRS pattern corresponding to the second portion indication bit is greater than a number of ports included in the DMRS pattern corresponding to the first portion indication bit.

Optionally, the receiver 501 is configured to receive one or more subsets configured from a predefined set of joint information indication for the second communication node by signaling, wherein different subsets of joint indication information are configured for different second communication nodes.

Optionally, the receiver 501 is configured to receive one or more subsets configured from a predefined set of joint indication information for the second communication node in a form of bit map by signaling.

Optionally, the receiver 501 is configured to receive one or more sets of joint information indication bits configured by the first communication node by higher layer signaling, wherein different sets of joint information indication bits are configured for different second communication nodes.

Optionally, if the first communication node configures a plurality of sets of joint indication information for the second communication node, the plurality of sets of joint indication information configured for the second communication node are combined into one set, indexes of information indication bits of the combined set are rearranged in an ascending order.

Optionally, the understanding of the second communication node according to the embodiment of the present disclosure may refer to the description of embodiments of the signaling indication method presented above, and the description thereof will be omitted here.

The second communication node according to the embodiment of the present disclosure may use the correlation among various parameter information in NR to indicate information through joint signaling, i.e., joint indication information, so as to jointly and effectively notify parameter information such as DMRS, MCS, and PTRS, which saves control signaling overhead and increases flexibility. In the meantime, the various DMRS patterns according to the embodiment of the present disclosure solve the problem of power non-equalization.

The embodiment of the present disclosure further provides a signaling indication method, including:

notifying a total number of resource particle pairs or a number of resource particle groups of the DMRS in a frequency domain transmission period, wherein a resource particle pair refers to a combination of two adjacent resource particles in a frequency domain, and a resource particle group refers to a combination of two resource particle pairs in adjacent time domains.

The base station directly notifies the UE of a total number of resource particle pairs or a number of resource particle groups of DMRS in a frequency domain transmission period, such that the UE, upon receipt of the notification, may know the number of resource particle pairs or the number of the resource particle groups used in the DMRS transmission, which is convenient for the UE to receive the DMRS and reduces the difficulty in receiving and detecting the DMRS by the UE. The notification sent from the base station may be any type of signaling of the base station, for example, higher layer signaling, etc.

The embodiment of the present disclosure further provides a computer storage medium for storing a computer executable program; after being executed, the computer executable program realizes any one of the signaling indication methods of the embodiments described above, for example, executes the method as shown in FIG. 1.

The computer storage medium may be any type of storage medium, optionally a non-transitory storage medium.

It should be known to those skilled in the art that embodiments of the present disclosure can be provided as a method, a system, or a computer program product. Accordingly, the present disclosure may take the form of a hardware embodiment, a software embodiment, or an embodiment combining software and hardware. Moreover, the present disclosure may employ a form of a computer program product executed on one or more computer readable storage mediums (including but not limited to magnetic disc memory and optical memory and so on) that include a computer usable program code.

The present disclosure is described with reference to flowcharts and/or block diagrams of the method, device (system), and computer program product according to the embodiments of the present disclosure. It should be understood that each process and/or block of the flowcharts and/or block diagrams and combinations of processes and/or blocks of the flowcharts and/or block diagrams may be implemented by computer program instructions. These computer program instructions may be provided to a general-purpose computer, a special-purpose computer, an embedded processor or a processor of other programmable data processing apparatuses to produce a machine, so that instructions executed by a processor of a computer or other programmable data processing apparatus produce an apparatus for realizing functions specified in one or more processes of the flow charts and/or one or more blocks of the block diagrams.

These computer program instructions may also be stored in a computer readable memory capable of booting a computer or other programmable data processing apparatus to operate in a particular manner, so that instructions stored in the computer readable memory produce a product including an instruction device for implementing functions specified in one or more processes of flow charts and/or one or more blocks of block diagrams.

These computer program instructions may also be loaded onto a computer or other programmable data processing apparatus, such that a series of operation steps are executed on the computer or other programmable data processing apparatus to generate computer implemented processes, so that instructions executed on the computer or other programmable data processing apparatus provide steps for realizing functions specified in one or more processes of flow charts and/or one or more blocks of block diagrams.

The above description is merely about exemplary embodiments of the present disclosure, and is not to limit a protection scope of the present disclosure.

INDUSTRIAL APPLICABILITY

The signaling indication method according to the embodiments of the present disclosure realizes different information indication using joint indication information, for example, joint indication of the DMRS information and PTRS information, thus reduces signaling overhead with respect to the case where one indication information uses one signaling, and reduces the control channel resources occupied by the signaling, having the advantageous effect of small signaling overhead and less control channel resource occupation, and meanwhile having the merits of simple implementation and high industrial applicability.

The invention claimed is:
1. A signaling indication method, comprising:
acquiring joint indication information; and
transmitting the joint indication information to a second communication node, wherein
the joint indication information is used for joint indication,
the joint indication information comprises demodulation reference signal DMRS information, and
the joint indication information further comprises at least one of: data modulation scheme, data coding scheme, transmission resource allocation, retransmission redundancy version RV, phase noise tracking reference signal PTRS, hybrid automatic repeat request HARQ process, time unit structure and data indication information,
wherein
the DMRS information comprises at least one of: a sequence number of DMRS port, a number of layers of data transmission and a DMRS pattern, wherein the DMRS pattern comprises at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS; and responsive to determining that the DMRS information and PTRS configuration information are jointly indicated, the DMRS information is configured to indicate whether the plurality of DMRS ports uses code division multiplexing CDM on a plurality of time domain symbols, wherein the PTRS configuration information comprises information indicating presence of PTRS.

2. The method according to claim 1, wherein
the DMRS information is jointly indicated together with data modulation scheme configuration information, data coding scheme configuration information or data modulation and coding scheme configuration information, wherein the DMRS information comprises at least one of: a number of DMRS time domain symbols and information on whether DMRS and data are simultaneously transmitted;

the data modulation scheme configuration information comprises at least one of: a dynamic data modulation scheme and a data modulation scheme threshold;

the data coding scheme configuration information comprises at least one of: a dynamic data coding scheme and a data coding scheme threshold; and the data modulation and coding scheme configuration information comprises at least one of: a dynamic data modulation and coding scheme and a data modulation and coding scheme threshold.

3. The method according to claim 1, wherein
the DMRS pattern and the time unit structure are jointly indicated, responsive to determining that the DMRS pattern comprises the positions of time domains of the first subset and second subset of the DMRS, a spacing of DMRS subsets corresponding to a short time unit is smaller than a spacing of DMRS subsets corresponding to a long time unit, the DMRS pattern comprises at least one of: a number of DMRS time domain symbols and a maximum number of orthogonal DMRS ports that the DMRS pattern supports, the time unit structure refers to a total number of symbols included in the time unit, a guard period and a number of uplink transmission symbols, and responsive to determining that the DMRS pattern comprises a plurality of subsets and the time unit structure is different, the position of time domain of the last subset of the DMRS is different.

4. The method according to claim 1, wherein
in at least one DMRS pattern, the seventh and tenth DMRS ports are mapped to the same resource position, the eighth and eleventh DMRS ports are mapped to the same resource position, and the ninth and twelfth DMRS ports according to are mapped to the same resource position, wherein the least one DMRS patterns support DMRS having a maximum of 12 ports on two consecutive orthogonal frequency division multiplexing OFDM symbols, in a transmission period of adjacent frequency domains, mapping of the DMRS ports is swapped on two adjacent OFDM symbols, and in physical transmission resources of adjacent frequency domains, mapping of the DMRS ports is swapped on two adjacent OFDM symbols.

5. The method according to claim 1, further comprising:
notifying a number of resource particle pairs or a number of resource particle groups of the DMRS in a frequency domain transmission period, wherein each resource particle pair refers to a combination of two adjacent resource particles in a frequency domain, and each resource particle group refers to a combination of two resource particle pairs in adjacent time domains.

6. The method according to claim 1, wherein
responsive to determining that the joint indication information comprises data modulation schemes, a plurality of data modulation schemes corresponding to the same codeword are indicated in a differential manner;

responsive to determining that the joint indication information comprises data coding schemes, a plurality of data coding schemes corresponding to the same codeword are indicated in a differential manner;

responsive to determining that the joint indication information comprises data modulation and coding schemes, a plurality of data modulation and coding schemes corresponding to the same codeword are indicated in a differential manner; and responsive to determining that the same codeword corresponds to a coding scheme, a modulation scheme corresponding to a plurality of transmission layers is indicated in a differential manner.

7. The method according to claim 1, wherein
indication bits having a number of DMRS ports less than M comprise: a first portion indication bit and a second portion indication bit, wherein the first portion indication bit distinguishes different scrambling sequences, and the second portion indication bit does not distinguish scrambling sequences, M being a natural number, the first portion indication bit and the second portion indication bit correspond to different DMRS patterns, and the number of ports included in a DMRS pattern corresponding to the second portion indication bit is greater than the number of ports included in a DMRS pattern corresponding to the first portion indication bit.

8. The method according to claim 1, further comprising:
configuring at least one subsets of joint indication information from a predefined set of joint indication information for the second communication node by signaling, wherein different subsets of joint indication information are configured for different second communication nodes; and configuring at least one subsets of joint indication information from predefined joint indication information for the second communication node in a form of bit map by signaling.

9. The method according to claim 1, further comprising:
configuring at least one sets of joint information indication bits for the second communication node by higher layer signaling, wherein different sets of joint information indication bits are configured for different second communication nodes wherein responsive to determining that a first communication node configures a plurality of sets of joint indication information for the second communication node, the plurality of sets of joint indication information configured for the second communication node are combined into a single set, and indexes of information indication bits of the combined set are rearranged in an ascending order.

10. A signaling indication method, comprising:
receiving joint indication information transmitted from a first communication node, wherein the joint indication information is used for joint indication, wherein
the joint indication information comprises demodulation reference signal DMRS information, and the joint indication information further comprises at least one of: data modulation scheme, data coding scheme, transmission resource allocation, retransmission redundancy version RV, phase noise tracking RS PTRS, hybrid automatic repeat request HARQ process, time unit structure and data indication information;
the DMRS information comprises at least one of: a sequence number of DMRS port, a number of layers of data transmission and a DMRS pattern, wherein the DMRS pattern comprises at least one of: a number of DMRS time domain symbols, DMRS frequency domain density, information on whether DMRS and data are simultaneously transmitted, and multiplexing scheme of a plurality of DMRS ports in a time domain, and positions of time domains of a first subset and a second subset of the DMRS; and
responsive to determining that the DMRS information and PTRS configuration information are jointly indicated, the DMRS information is configured to indicate whether the plurality of DMRS ports uses code division multiplexing CDM on a plurality of time domain symbols,
wherein the PTRS configuration information comprises information indicating presence of PTRS.

11. The method according to claim 10, wherein
the DMRS information is jointly indicated together with data modulation scheme configuration information, data coding scheme configuration information or data modulation and coding scheme configuration information;
wherein the DMRS information comprises at least one of: a number of DMRS time domain symbols and information on whether DMRS and data are simultaneously transmitted;
the data modulation scheme configuration information comprises at least one of: a dynamic data modulation scheme and a data modulation scheme threshold;
the data coding scheme configuration information comprises at least one of: a dynamic data coding scheme and a data coding scheme threshold; and
the data modulation and coding scheme configuration information comprises at least one of: a dynamic data modulation and coding scheme and a data modulation and coding scheme threshold.

12. The method according to claim 10, wherein
the DMRS pattern and the time unit structure are jointly indicated,
responsive to determining that the DMRS pattern comprises the positions of time domains of a first subset and a second subset of the DMRS, a spacing of DMRS subsets corresponding to a short time unit is smaller than a spacing of DMRS subsets corresponding to a long time unit,
the DMRS pattern comprises at least one of: a number of DMRS time domain symbols and a maximum number of orthogonal DMRS ports that the DMRS pattern supports,
the time unit structure refers to a total number of symbols included in the time unit, a guard period and a number of uplink transmission symbols,
responsive to determining that the DMRS pattern comprises a plurality of subsets, and the time unit structure is different, the position of time domain of the last subset of the DMRS is different.

13. The method according to claim 10, wherein
in at least one DMRS pattern, the seventh and tenth DMRS ports are mapped to the same resource position, the eighth and eleventh DMRS ports are mapped to the same resource position, and the ninth and twelfth DMRS ports are mapped to the same resource position, wherein the at least one DMRS pattern support DMRS having a maximum of 12 ports on two consecutive OFDM symbols;
in a transmission period of adjacent frequency domains, mapping of the DMRS ports is swapped on two adjacent OFDM symbols; and
in physical transmission resources of adjacent frequency domains, mapping of the DMRS ports is swapped on two adjacent OFDM symbols.

14. The method according to claim 10, wherein
responsive to determining that the joint indication information comprises data modulation scheme, a plurality of data modulation schemes corresponding to the same codeword are indicated in a differential manner;
responsive to determining that the joint indication information comprises data coding scheme, a plurality of data coding schemes corresponding to the same codeword are indicated in a differential manner;
responsive to determining that the joint indication information comprises the data modulation and coding scheme, a plurality of data modulation and coding schemes corresponding to the same codeword are indicated in a differential manner;
responsive to determining that the same codeword corresponds to a coding scheme, a modulation scheme corresponding to a plurality of transmission layers is indicated in a differential manner;
indication bits having a number of DMRS ports less than M comprise: a first portion indication bit and a second portion indication bit, wherein the first portion indication bit distinguishes different scrambling sequences, and the second portion indication bit does not distinguish scrambling sequences, M being a natural number;
the first portion indication bit and the second portion indication bit correspond to different DMRS patterns; and
the number of ports included in a DMRS pattern corresponding to the second portion indication bit is greater than the number of ports included in a DMRS pattern corresponding to the first portion indication bit.

15. The method according to claim 10, further comprising:
receiving at least one subsets of joint indication information configured by the first communication node from a predefined set of joint indication information by signaling, wherein different subsets of joint indication information are configured for different second communication nodes; and receiving at least one subsets of joint indication information configured by the first communication node from a predefined set of joint indication information in a form of bit map by signaling.

16. The method according to claim 10, further comprising:
receiving at least one sets of joint information indication bits configured by the first communication node by higher layer signaling, wherein different sets of joint information indication bits are configured for different second communication nodes,
wherein responsive to determining that a first communication node configures a plurality of sets of joint indication information for the second communication node, the plurality of sets of joint indication information configured for the second communication node are combined into a single set, and indexes of information indication bits of the combined set are rearranged in an ascending order.

17. A signaling indication device, configured to implement the method according to claim 1.

18. A signaling indication device, configured to implement the method according to claim 10.

* * * * *